US009261263B2

(12) United States Patent
Pearson et al.

(10) Patent No.: US 9,261,263 B2
(45) Date of Patent: Feb. 16, 2016

(54) COMMERCIAL LIGHTING INTEGRATED PLATFORM

(71) Applicant: Tempo Industries, LLC, Irvine, CA (US)

(72) Inventors: Dennis Pearson, Foothill Ranch, CA (US); Guang Jin, Santa Monica, CA (US); Wesley Scott Dochnahl, Upland, CA (US); Jorge Santana, Irvine, CA (US)

(73) Assignee: Tempo Industries, LLC, Irvine, CA (US)

(*) Notice: Subject to any disclaimer, the term of this patent is extended or adjusted under 35 U.S.C. 154(b) by 318 days.

(21) Appl. No.: 13/689,489

(22) Filed: Nov. 29, 2012

(65) Prior Publication Data

US 2013/0279180 A1 Oct. 24, 2013

Related U.S. Application Data

(60) Provisional application No. 61/637,115, filed on Apr. 23, 2012.

(51) Int. Cl.

| | |
|---|---|
| ***B60Q 1/06*** | (2006.01) |
| ***F21V 21/008*** | (2006.01) |
| ***F21S 2/00*** | (2006.01) |
| ***F21S 8/06*** | (2006.01) |
| ***F21V 15/015*** | (2006.01) |
| ***F21V 21/005*** | (2006.01) |
| ***F21V 21/104*** | (2006.01) |
| ***F21V 21/112*** | (2006.01) |
| ***F21V 23/00*** | (2015.01) |
| ***F21V 23/02*** | (2006.01) |
| *F21Y 101/02* | (2006.01) |
| *F21Y 103/00* | (2006.01) |

(52) U.S. Cl.

CPC ................ *F21V 21/008* (2013.01); *F21S 2/00* (2013.01); *F21S 8/063* (2013.01); *F21V 15/015* (2013.01); *F21V 21/005* (2013.01); *F21V 21/104* (2013.01); *F21V 21/112* (2013.01); *F21V 23/004* (2013.01); *F21V 23/023* (2013.01); *F21Y 2101/02* (2013.01); *F21Y 2103/003* (2013.01)

(58) Field of Classification Search

CPC ...... F21Y 2103/003; F21S 8/02; F21V 21/14; F21V 21/048; F21V 17/12

USPC ............ 362/217.01, 217.02, 217.12, 217.14, 362/364, 365, 371, 372

See application file for complete search history.

(56) References Cited

U.S. PATENT DOCUMENTS

| | | | | |
|---|---|---|---|---|
| 3,589,660 A * | 6/1971 | Dunckel | ....................... | 248/343 |
| 4,039,821 A * | 8/1977 | Greene et al. | ............ | 362/217.08 |
| 4,338,653 A * | 7/1982 | Marrero | ........................ | 362/223 |
| 4,976,633 A * | 12/1990 | Beghelli | ....................... | 439/571 |

(Continued)

*Primary Examiner* — Evan Dzierzynski
*Assistant Examiner* — Tsion Tumebo
(74) *Attorney, Agent, or Firm* — Lapple Ubell IP Law, LLP; Franklin D. Ubell

(57) ABSTRACT

One or more interconnectable modules, each comprising a housing mounting an LED circuit board on an underside thereof and having a guide track on a top surface thereof with one or more slip fitter components shaped to slidably insert into and engage or attach to the guide track and configured to cooperate with one or more of a ceiling mounting bracket, a hanger bracket, an eye hanger and a cable hanging arrangement in order to provide multiple modes of hanging, suspending or otherwise mounting the one or more lighting modules.

14 Claims, 36 Drawing Sheets

(56) References Cited

U.S. PATENT DOCUMENTS

| | | | | |
|---|---|---|---|---|
| 5,031,083 | A * | 7/1991 | Claesson | 362/249.06 |
| 5,803,588 | A * | 9/1998 | Costa | 362/223 |
| 6,903,265 | B1 * | 6/2005 | VanderVelde et al. | 174/481 |
| 7,674,010 | B2 * | 3/2010 | Griffiths et al. | 362/249.02 |
| 7,726,840 | B2 | 6/2010 | Pearson et al. | |
| 7,854,527 | B2 * | 12/2010 | Anderson | 362/133 |
| 8,002,426 | B2 | 8/2011 | Pearson et al. | |
| 8,061,870 | B2 | 11/2011 | Pearson et al. | |
| 8,142,047 | B2 * | 3/2012 | Acampora et al. | 362/217.01 |
| 8,317,369 | B2 * | 11/2012 | McCanless | 362/368 |
| 8,398,276 | B2 | 3/2013 | Pearson et al. | |
| 8,454,192 | B2 * | 6/2013 | Rouse et al. | 362/217.12 |
| 8,556,451 | B1 * | 10/2013 | Wilkinson | 362/217.05 |
| 2002/0050374 | A1 * | 5/2002 | Vander Velde | 174/48 |
| 2003/0137835 | A1 * | 7/2003 | Mier-Langner et al. | 362/220 |
| 2003/0174517 | A1 * | 9/2003 | Kiraly et al. | 362/555 |
| 2005/0047129 | A1 * | 3/2005 | Eppler | 362/217 |
| 2007/0047229 | A1 * | 3/2007 | Lee | 362/237 |
| 2007/0274084 | A1 * | 11/2007 | Kan et al. | 362/373 |
| 2011/0228525 | A1 * | 9/2011 | Vermeland et al. | 362/217.11 |
| 2012/0051041 | A1 | 3/2012 | Edmond et al. | |
| 2013/0021792 | A1 | 1/2013 | Snell et al. | |
| 2013/0070461 | A1 | 3/2013 | Pickard | |
| 2013/0176722 | A1 | 7/2013 | Lay et al. | |
| 2013/0208457 | A1 | 8/2013 | Durkee et al. | |
| 2013/0208469 | A1 | 8/2013 | Progl | |
| 2013/0250567 | A1 | 9/2013 | Edmond et al. | |
| 2013/0271979 | A1 | 10/2013 | Pearson et al. | |
| 2013/0272000 | A1 | 10/2013 | Pearson et al. | |
| 2013/0279165 | A1 | 10/2013 | Pearson et al. | |
| 2013/0279179 | A1 | 10/2013 | Pearson et al. | |

* cited by examiner

COMMERCIAL LIGHTING INTEGRATED PLATFORM

CROSS REFERENCE TO RELATED APPLICATION

This application claims the benefit of and priority to U.S. Provisional Application Ser. No. 61/637,115, filed Apr. 23, 2012, entitled "Suspendable LED Light Fixture," the contents of which is hereby incorporated herein by reference herein in its entirety.

FIELD OF THE DISCLOSURE

The subject disclosure relates to LED light fixtures and more particularly to such fixtures which are modular so that they may vary in length and are readily adaptable to be suspended from or otherwise connected to, a ceiling or a variety of other surfaces in a number of different manners and configurations.

RELATED ART

In the past, twin tube fluorescent T-5, T-8, and T-12 fixtures have been used to provide overhead illumination.

SUMMARY

Light fixture apparatus according to one illustrative embodiment comprises one or more interconnectable modules each module comprising a housing mounting an LED circuit board on an underside thereof and having a guide track mounted on a top surface thereof and attached thereto. A slip fitter component is shaped to slidably insert into and engage or attach to the guide track. The apparatus may include a ceiling mounting bracket, a hanger bracket, an eye hanger and/or a cable hanging arrangement, each of which is adapted to mate and interconnect with the slip fitter component to provide multiple modes of hanging or suspending of the one or more lighting modules.

A particularly advantageous lighting apparatus embodiment disclosed hereafter may comprise a lighting platform for mounting one or more LEDs having a first bottom cover having respective first and second side channels formed at opposite corners thereof, each side channel comprising a horizontal bottom edge curving into a vertical side edge, and an upper housing having respective outer side surfaces which, at respective upper ends thereof, extend outwardly, then vertically downward, then horizontally inward and then downward to form respective extended end tip surfaces. In one embodiment, respective screws may be inserted through the first and second channels and angled upwardly and threaded into the end tip surfaces of the upper housing to thereby attach the bottom cover to the upper housing. Another advantageous feature comprises a driver assembly for powering the LEDs mounted in an internal cavity defined by the bottom cover and the upper housing, the driver assembly being spring biased upwardly and otherwise configured to facilitate heat transfer between the driver assembly and the upper housing.

DETAILED DESCRIPTION OF ILLUSTRATIVE EMBODIMENTS

Figure 3:
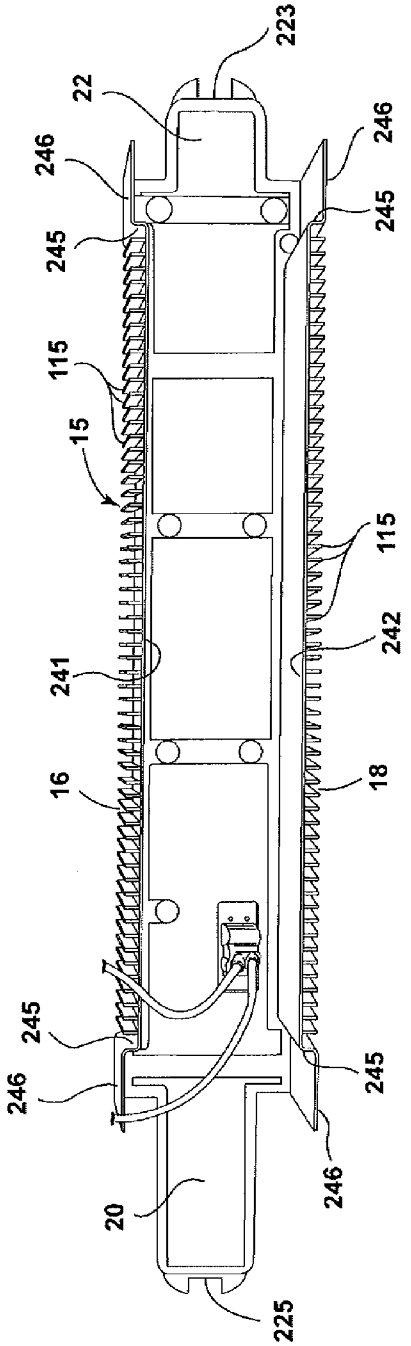
FIG. 3 is a bottom view of a lower housing component of the apparatus of FIG. 1.
Figure 4:
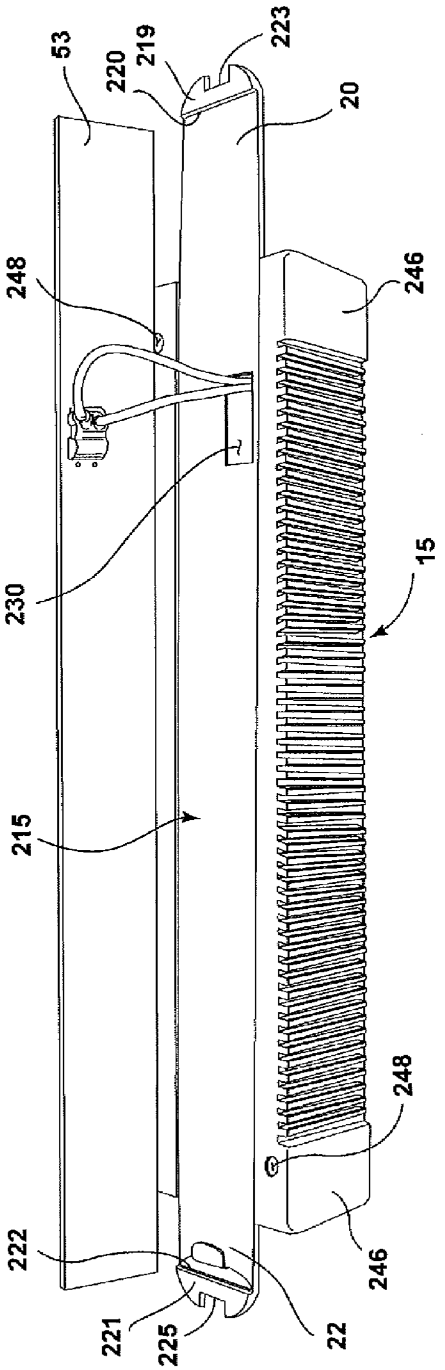
FIG. 4 is a perspective top view of the housing component of FIG. 3 and a cooperating printed circuit board.
Figure 5:
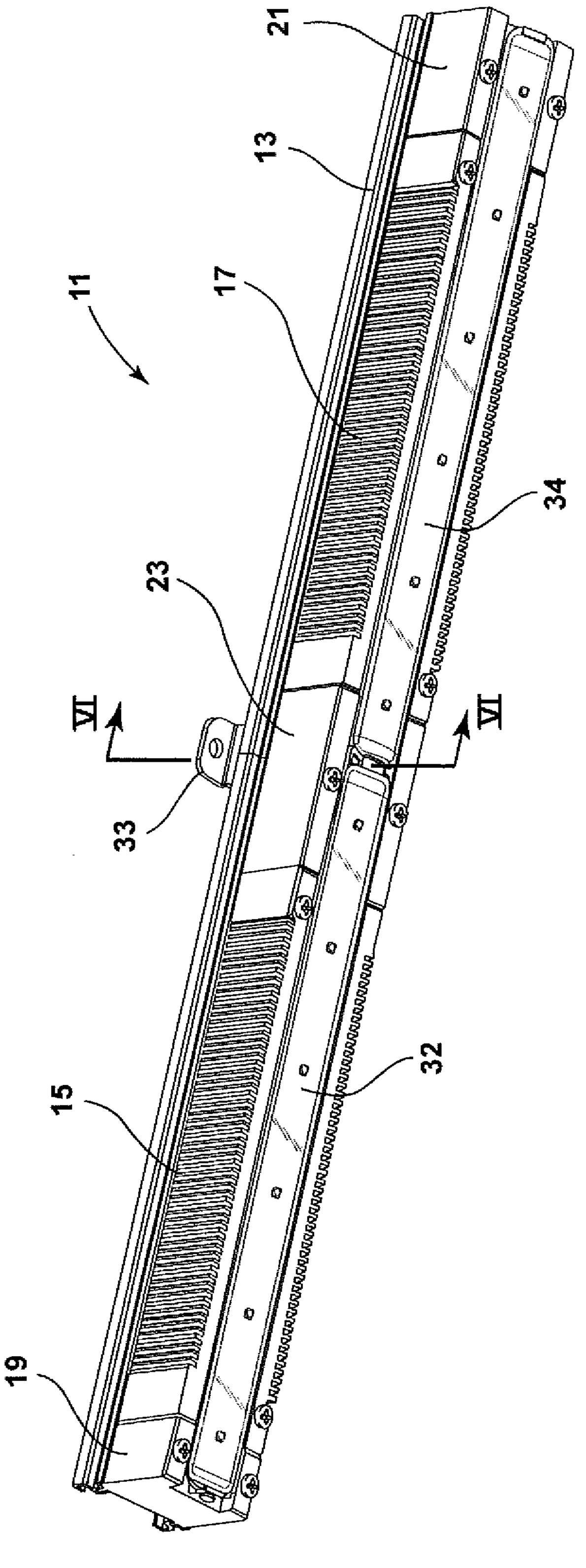
FIG. 5 is a perspective view looking upward at the light fixture apparatus of FIG. 1.

An illustrative embodiment of a suspendable LED light fixture 11 is illustrated in FIGS. 1-6. As shown, the illustrative fixture 11 includes a guide track 13; first and second lower housing components 15, 17; respective end mounted junction boxes 19, 21; central side panels 23, 25; an LED driver module 27; a number of bolts 29; and first and second lens covers 32, 34 (FIG. 5). The particular apparatus illustrated in FIG. 1 further includes a slip fitter component 31, a ceiling bracket mounting component 33 and a jack chain mounting component 35. The lower housing components 15, 17 further comprise suitable vertical heat sink fins, e.g., 115, for thermal management purposes and may be fabricated of the zinc alloy Zamak III. The lower housing components, e.g. 15, are positioned below the guide track 13 with respective outer side faces 16, 18 being flushly mounted against the inner edge of respective lips 61, 63 (FIG. 6) of the mounting or guide track 13.

One of the lower housing components 15, 17 is illustrated in more detail in FIGS. 3 and 4. In one embodiment, each lower housing component, e.g., 15, is a single piece component and is identical to each other lower housing component. As seen in FIG. 4, the lower housing component 15 has a flat, generally rectangular recessed area 215 into which an LED-carrying printed circuit board, e.g., 53, may be mounted, for example, by heat conductive double-sided tape. At each end of the recessed area 215 is formed a rounded nose portion 219, 221, each of which has a respective rear edge 220, 222, which rises above the recessed area 215 and provides a surface which positions a respective end of the circuit board 215. Each rounded nose 219, 221 also has a slot 223, 225 formed therein, which receives respective prongs 57, 59 (FIG. 6) of a lens cover e.g., 32. An opening 230 is formed in the recessed area 215 to receive electrical interconnection componentry.

As may be seen in FIG. 3, the interior of each lower housing component, e.g., 15, comprises a generally hollow space, defined by the inside surfaces of respective vertical, generally rectangular sidewalls 241, 242. The outer surfaces of each sidewall 241, 242 carry integrally formed vertical heat sink fins, e.g., 115. Each rectangular side surface 241, 242 forms into a bend 245 at its respective ends and then into a solid rectangular end side surfaces 246, which in one embodiment may lie generally planar with the outer edges of the vertical heat sink fins 115. Respective screw or fastener receiving holes, e.g., 248, are also provided.

Figure 1:
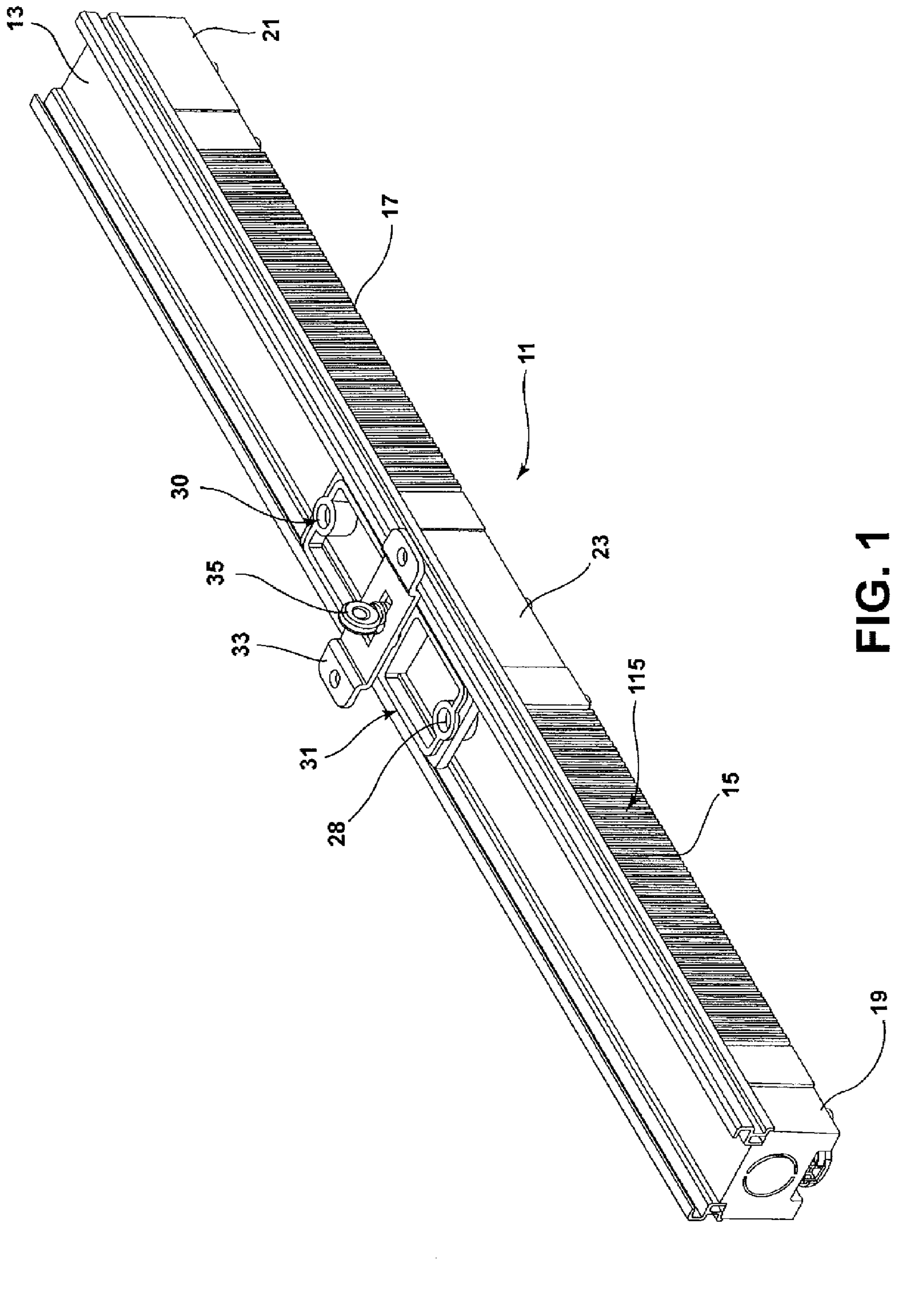
FIG. 1 is a perspective view of an illustrative embodiment of a suspendable LED light fixture apparatus.
Figure 6:
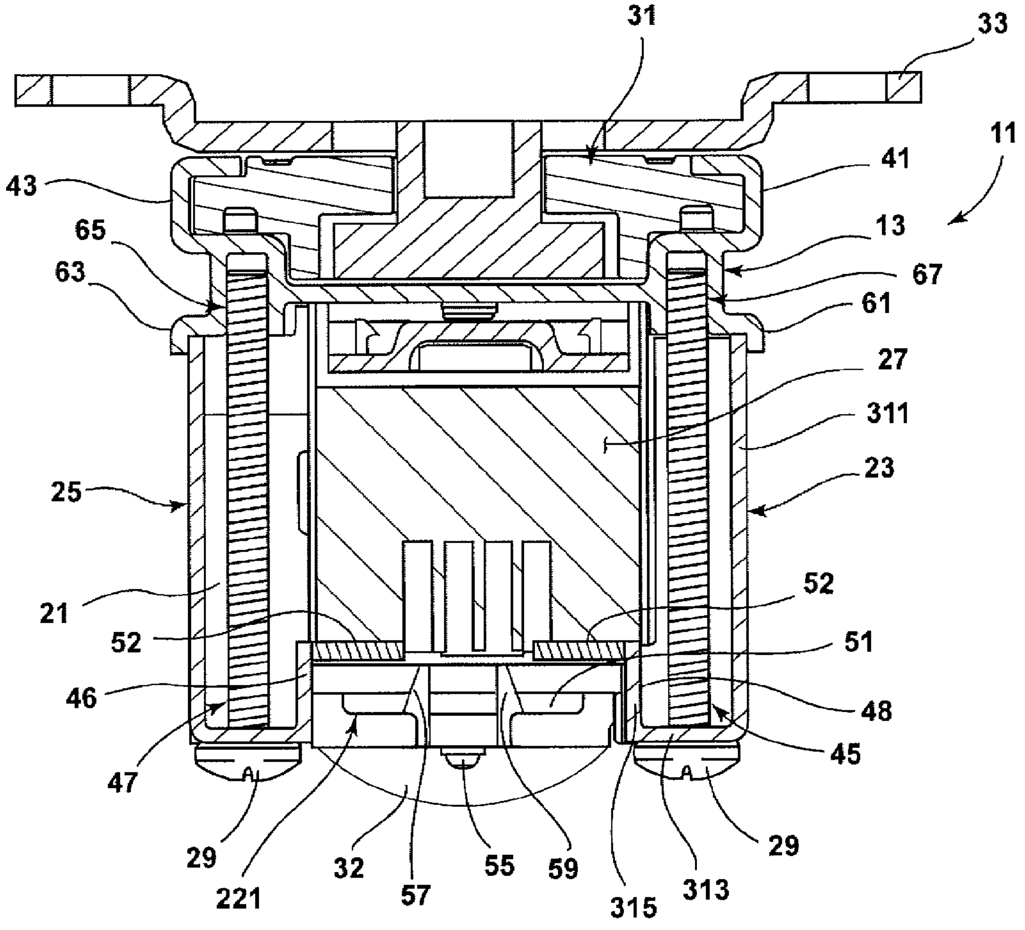
FIG. 6 is a sectional view taken at VI-VI of FIG. 5.
Figure 7:
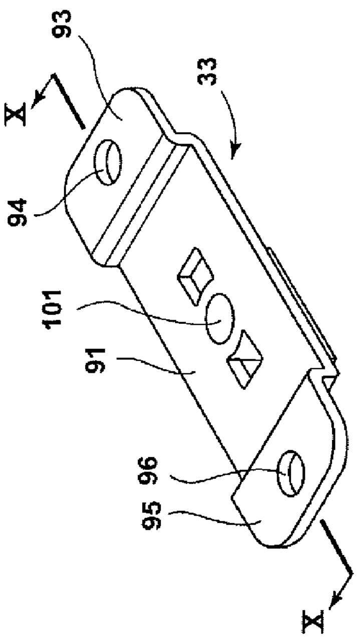
FIG. 7 is a perspective view of an illustrative ceiling mounting bracket component.
Figure 8:
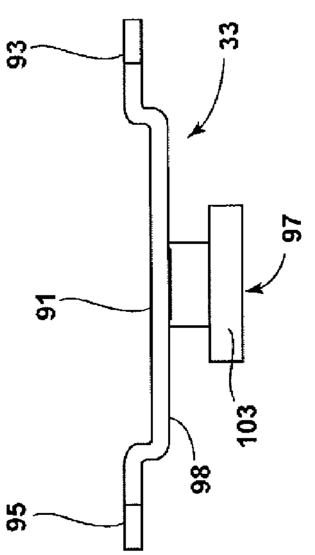
FIG. 8 is a side view of the component of FIG. 7.
Figure 9:
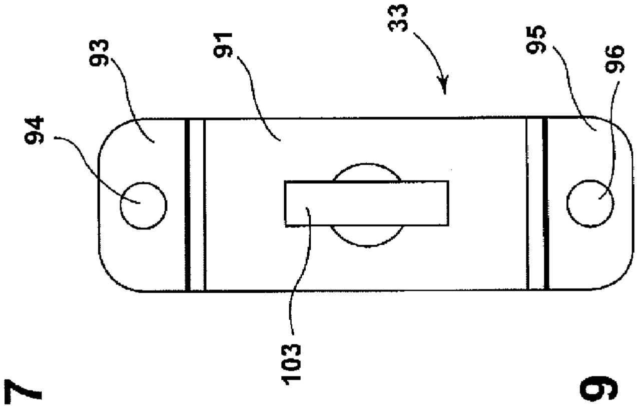
FIG. 9 is a bottom view of the component of FIG. 8.
Figure 10:
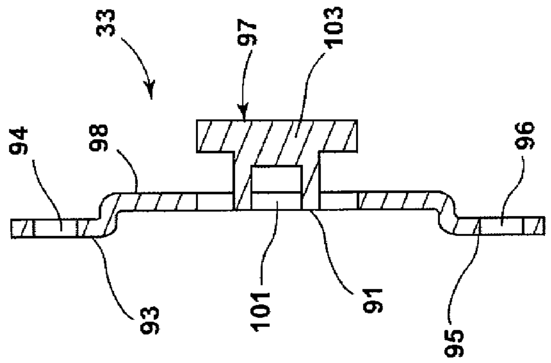
FIG. 10 is a sectional view of the component of FIG. 7 taken at X-X of FIG. 7.

As may be appreciated from FIG. 1 and FIG. 6, the slip fitter component 31 is slidingly inserted into, guided and retained by respective horizontally disposed channels 41, 43 of u-shaped cross-section formed at opposite sides of the guide track 13. Screws or other fastening devices 36, 38 (FIG. 2) may be inserted through bosses 28, 30 into the guide track 13 to fix the slip fitter 31 in position.

FIG. 6 further illustrates respective lips 61, 63 on either side of the guide track 13, which fit down flushly adjacent the outer surface of each respective side panel side 311. The bolts 29 insert through suitable holes and are screwed into respective vertical channels 65, 67 of generally rectangular cross-section formed in the guide track 13 below the horizontal channels 41, 43. In the embodiment shown, these vertical channels 65, 67 are suitably formed during an extrusion process so that bolts, screws or other fastening devices 29 are self-threading into the channels, thereby avoiding the need to cut threads in the channels 65, 67. Lower vertical channels 45, 47 of rectangular cross-section are formed in the side panels 23, 25. The respective inner vertical sides 315 of these channels form unitarily into respective planar horizontal surfaces 52, which may serve to support the LED driver module 27. FIG. 6 further shows one or more LED lighting devices, e.g., 55 and the lens cover, e.g., 32 with respective prongs 57, 59 positioned, shaped and dimensioned to snap or otherwise fit through suitable apertures 223, 225 formed in an end tab or tongue, e.g., 221 of lower housing component 15.

The embodiment shown in FIG. 6 particularly employs the ceiling mounting bracket 33, shown in more detail in FIGS. 7-10. As may be seen, the mounting bracket 33 has a central rectangular portion 91 with raised flanges 93, 95 having respective holes 94, 96 formed at respective ends thereof. A cylindrical portion 97 depends from the underside 98 of the mounting bracket 33. A cylindrical well 101 is formed in the top portion of the cylindrical portion 97, and a rectangular bar 103 is formed on the lower end of the cylindrical portion 97.

Figure 11:
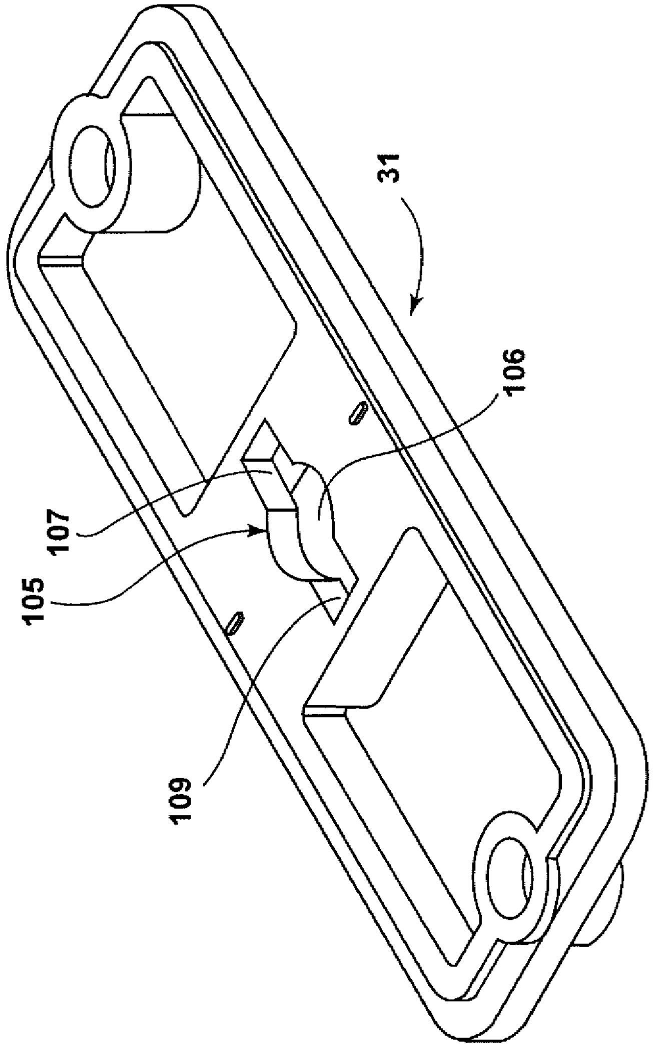
FIG. 11 is a perspective view of an illustrative embodiment of a slip fitter component.

As may be seen in FIG. 11, the slip fitter component 31 has a central slot 105 formed therein, which includes a circular central portion 106 with respectively longitudinally running rectangular end slot portions 107, 109. This central slot 105 is shaped and dimensioned or "keyed" such that the rectangular bar 103 of the ceiling mounting bracket 33 may be inserted therein and then rotated 90 degrees to lock, hold, and retain the ceiling mounting bracket 33 in the position illustrated in FIG. 6 wherein screws or other fastening devices may be inserted through the respective mounting holes 94, 96 to attach the fixture 11 to a ceiling or other surface.

Figure 12:
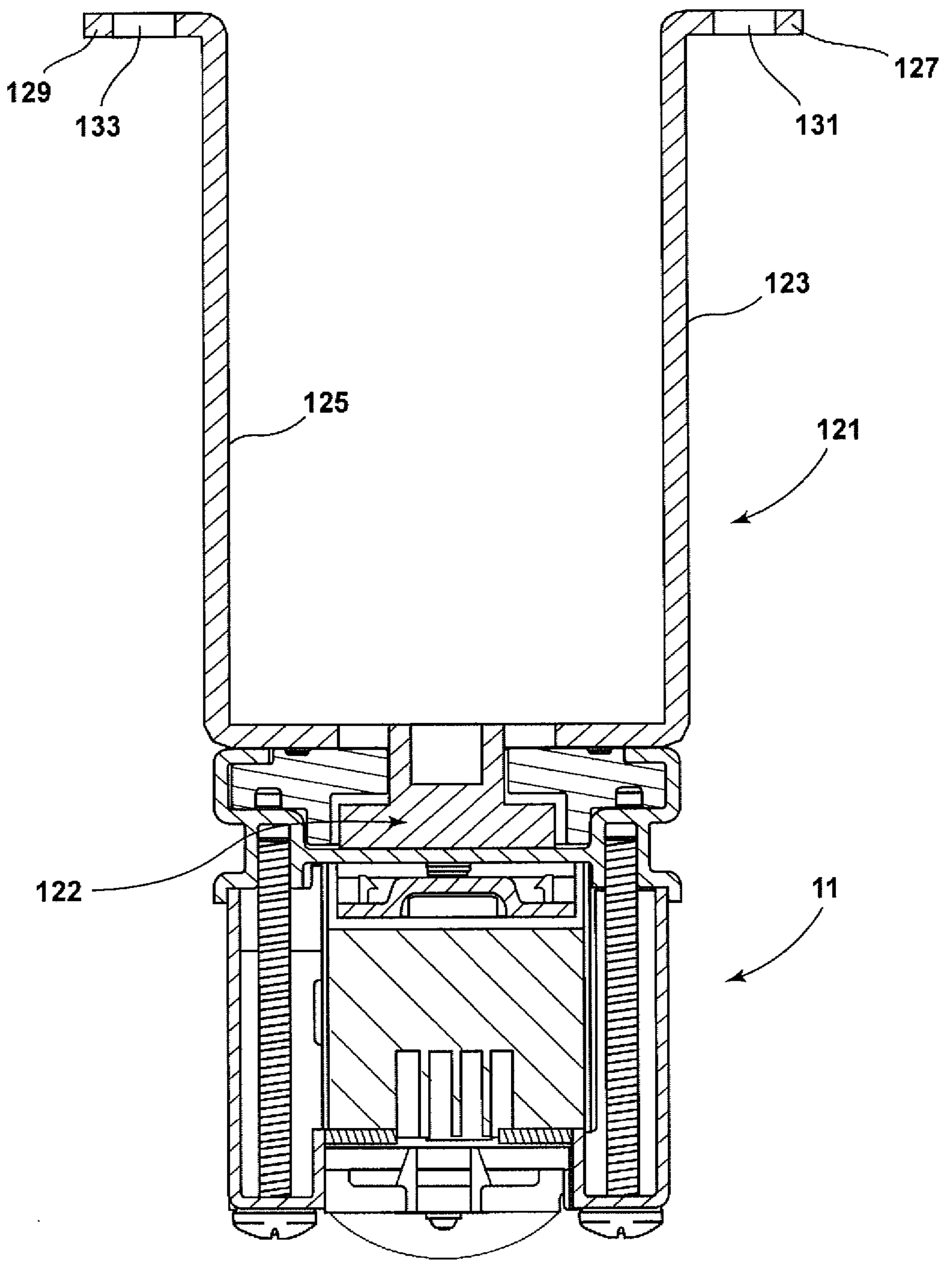
FIG. 12 is a cross-sectional view showing an illustrative embodiment of a hanging bracket component.

FIG. 12 illustrates a hanging bracket 121 employed in an illustrative embodiment. The hanging bracket 121 has a lower end 122 which may be constructed in similar fashion to the ceiling bracket 33 with a horizontal bar keyed to interlock with the central slot 105 of the slip fitter component 31. The illustrative hanging bracket embodiment 121 includes two vertical extending arms 123, 125, which form into horizontally disposed mounting pads or flanges 127, 129, with suitable mounting holes 131, 133 to facilitate attachment to a surface located above the fixture 11, such as a ceiling or a large soffit in a retrofit construction.

Figure 13:
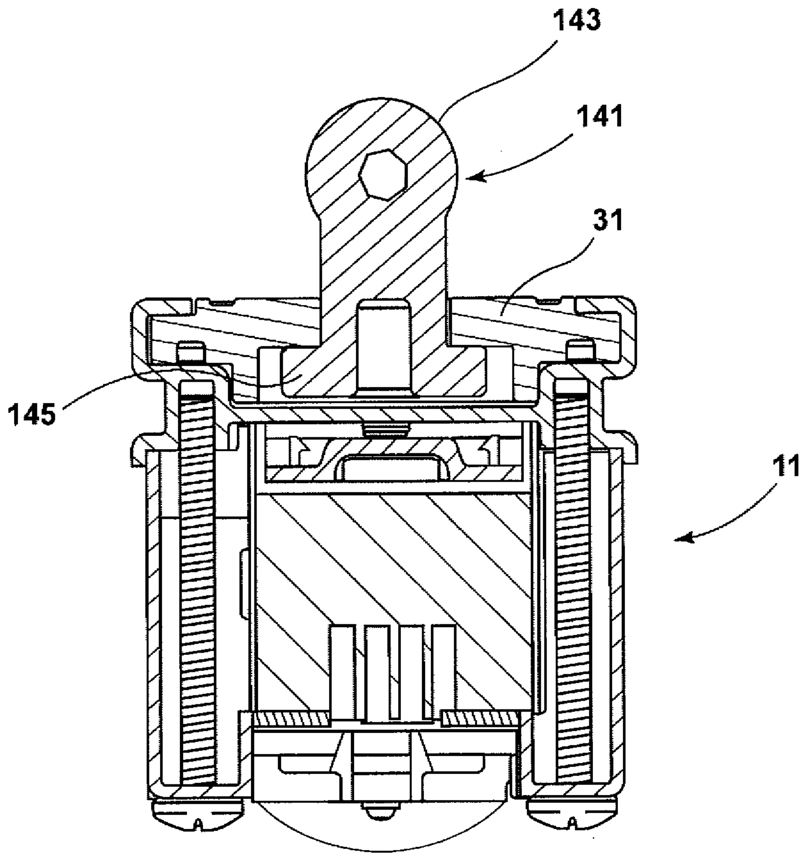
FIG. 13 is a cross-sectional view showing an illustrative embodiment of an eye hanger component.

FIG. 13 illustrates employment of an eye hanger component 141 according to an illustrative embodiment, which enables the illustrative fixture 11 to be suspended using jack chain or other types of chains or other suspension components which can interconnect with the eye 143 of the hanger component 141. The eye component 141 is inserted from the underside of the slip fitter component 31 through the central opening 105 thereof during assembly and includes a lower cylindrical flange portion 145, which retains the eye hanger 141 in place.

Figure 14:
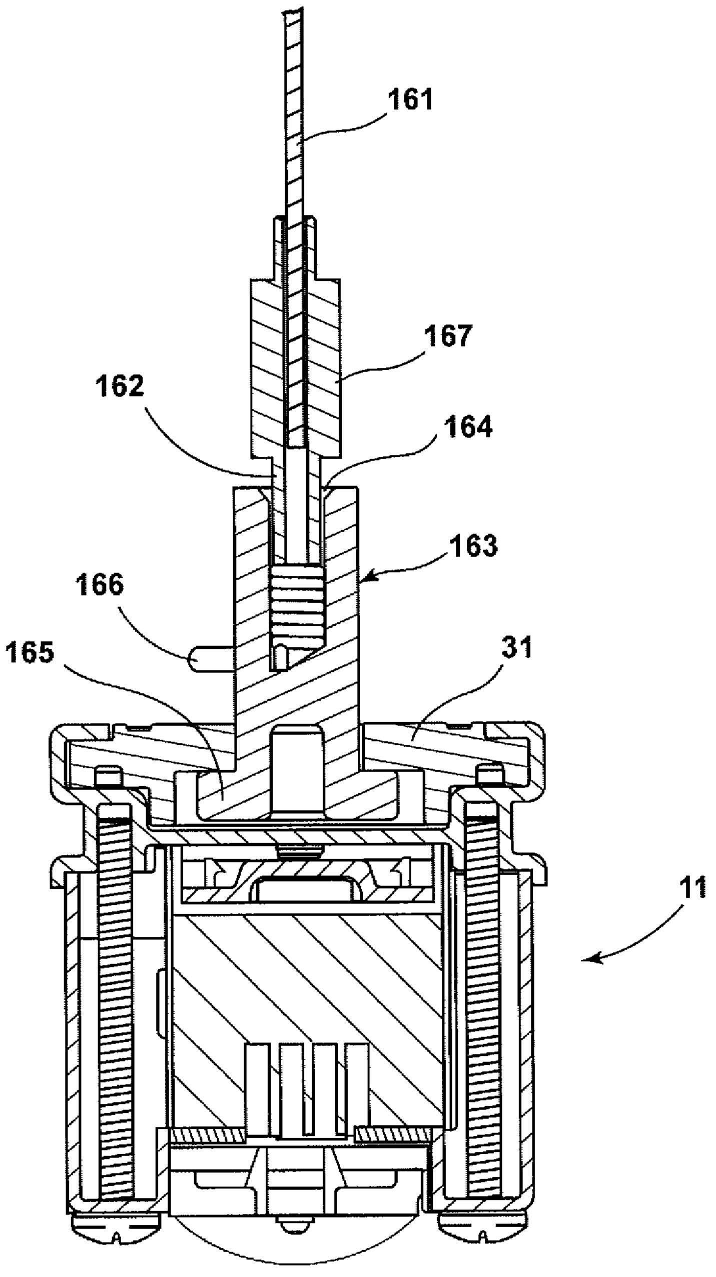
FIG. 14 is a cross-sectional view showing an illustrative embodiment of cable connector apparatus.
Figure 15:
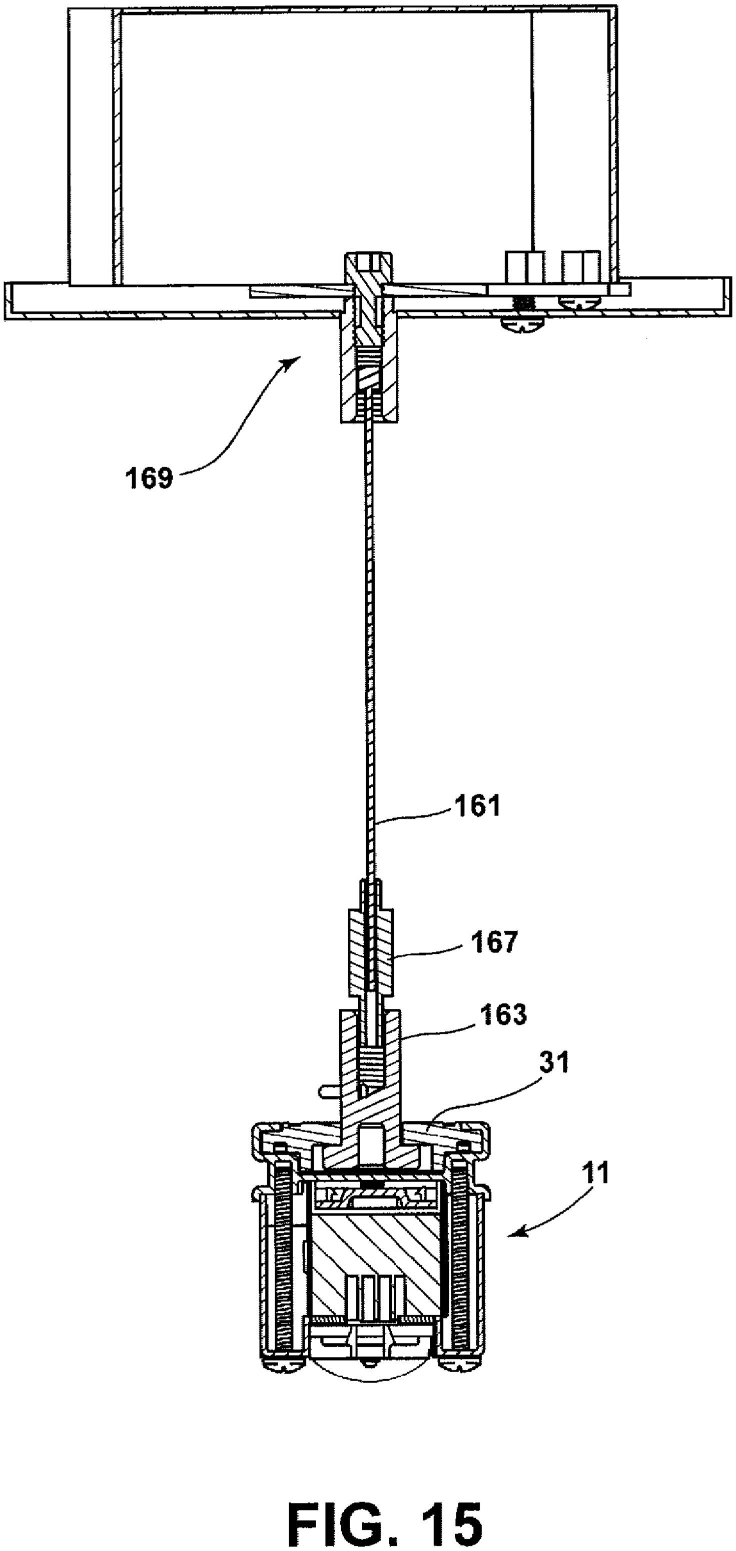
FIG. 15 is a cross-sectional view further illustrating an embodiment of lighting apparatus suspended by a cable connector.
Figure 22:
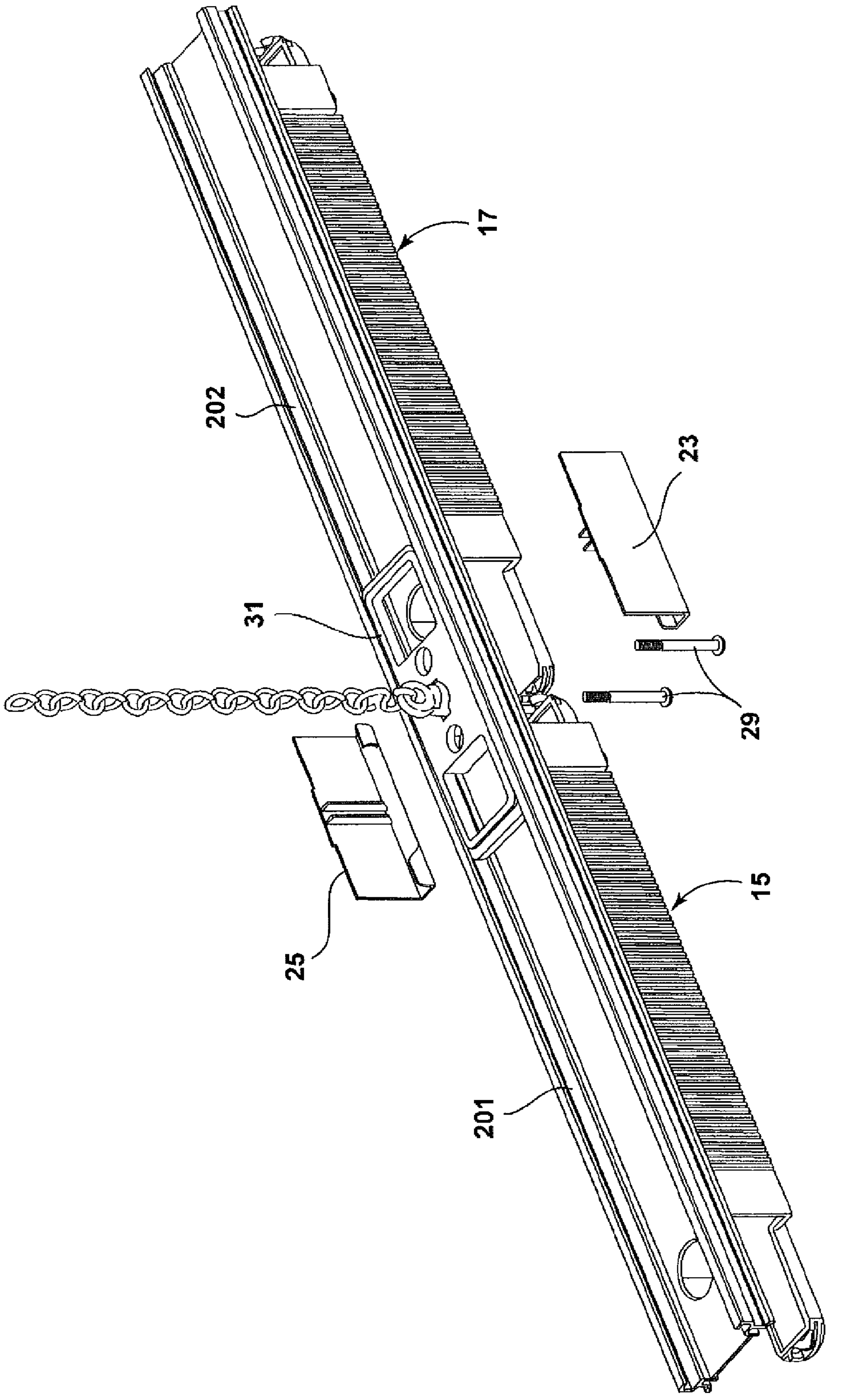

FIG. 14 illustrates application of an illustrative embodiment adapted to be suspended by a cable 161. This application employs a cable group connector 163, whose lower end may be shaped similarly to that of the eye hanger 141 so as to be insertable into the central opening 105 of the slip fitter component 31 through the underside thereof and be retained in place by an end flange portion 165. The cable gripper connector 163 receives a cable gripper 167 in a central cylindrical opening 164 in its upper end. The cable 161 exits through a side opening in the connector 163 and terminates at end 166. FIG. 15 illustrates a cable gripper assembly 163 cooperating with a ceiling mounting assembly 169. In various embodiments, more than one slip fitter 31 may be inserted into a guide track 13, for example, as shown in FIG. 22, to accommodate various suspension requirements or designs.

Figure 16:
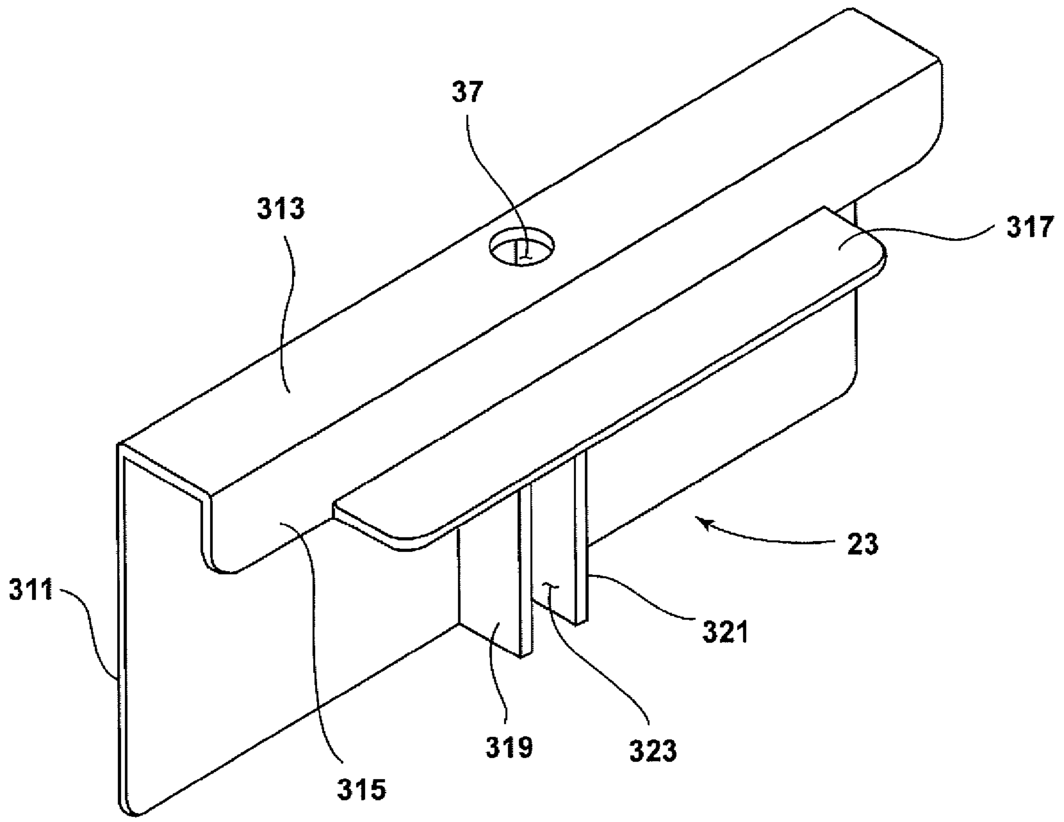
FIG. 16 is a perspective view of an illustrative embodiment of a side panel component of the apparatus of FIG. 1.

As shown in FIG. 16, a single piece side panel, e.g., 23, includes a flat vertical side surface 311 which unitarily forms into a rectangular horizontal surface 313 and then into a vertically depending surface 315. A horizontal lip 317 is unitarily formed at the end of depending surface 315. This lip 317 is positioned such that it is located adjacent to, or in contact with, the bottom surface of the driver unit 27. Vertical side ribs 319, 321 provide strength to the unit 23 and are positioned such that a mounting screw, e.g., 29, inserted through opening or hole 327 lies between them in a slot 323 defined by the ribs 319, 321. In order to add a third module providing a third housing component, a second pair of panels 23, 25 may be used to attach the third module to the one of the first and second modules shown in FIG. 1.

Figure 17:
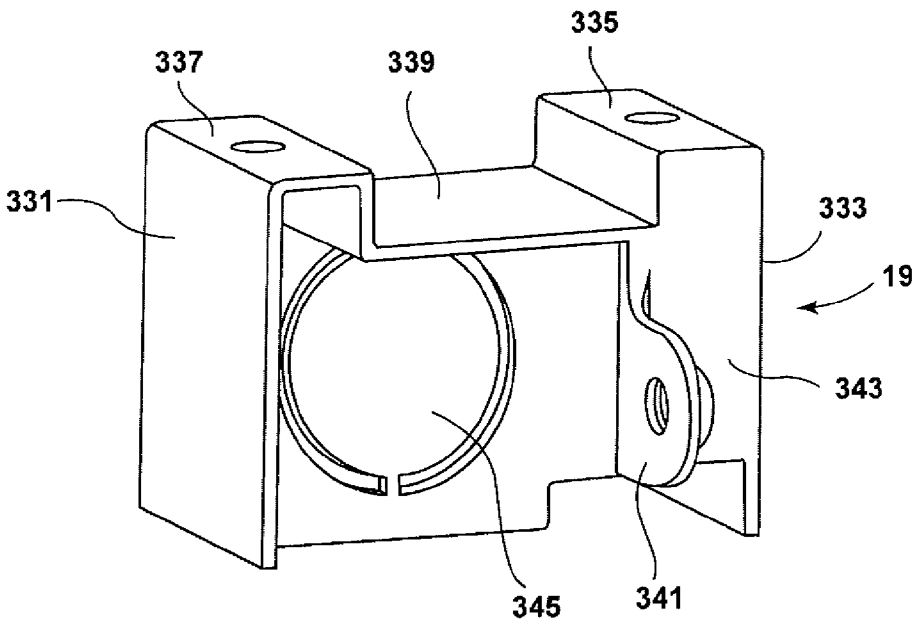
FIG. 17 is a perspective view of an illustrative embodiment of a first end junction box component.

An end junction box component 19 is illustrated in FIG. 17. The component 19 includes respective side surfaces 331, 333, and top surfaces 335, 337, which are flat and positioned to mate and form generally flush surfaces with respective side surfaces and top surfaces of the housing components e.g., 15. A channel 339 is formed between the respective top surfaces 335, 337 to receive an end tab or tongue, e.g. 22 of the lower housing component 17. A grounding tab 341 extends from a flat surface 343. A "knock out" 345 is provided for electrical cable/lead exit or entry.

Figure 2:
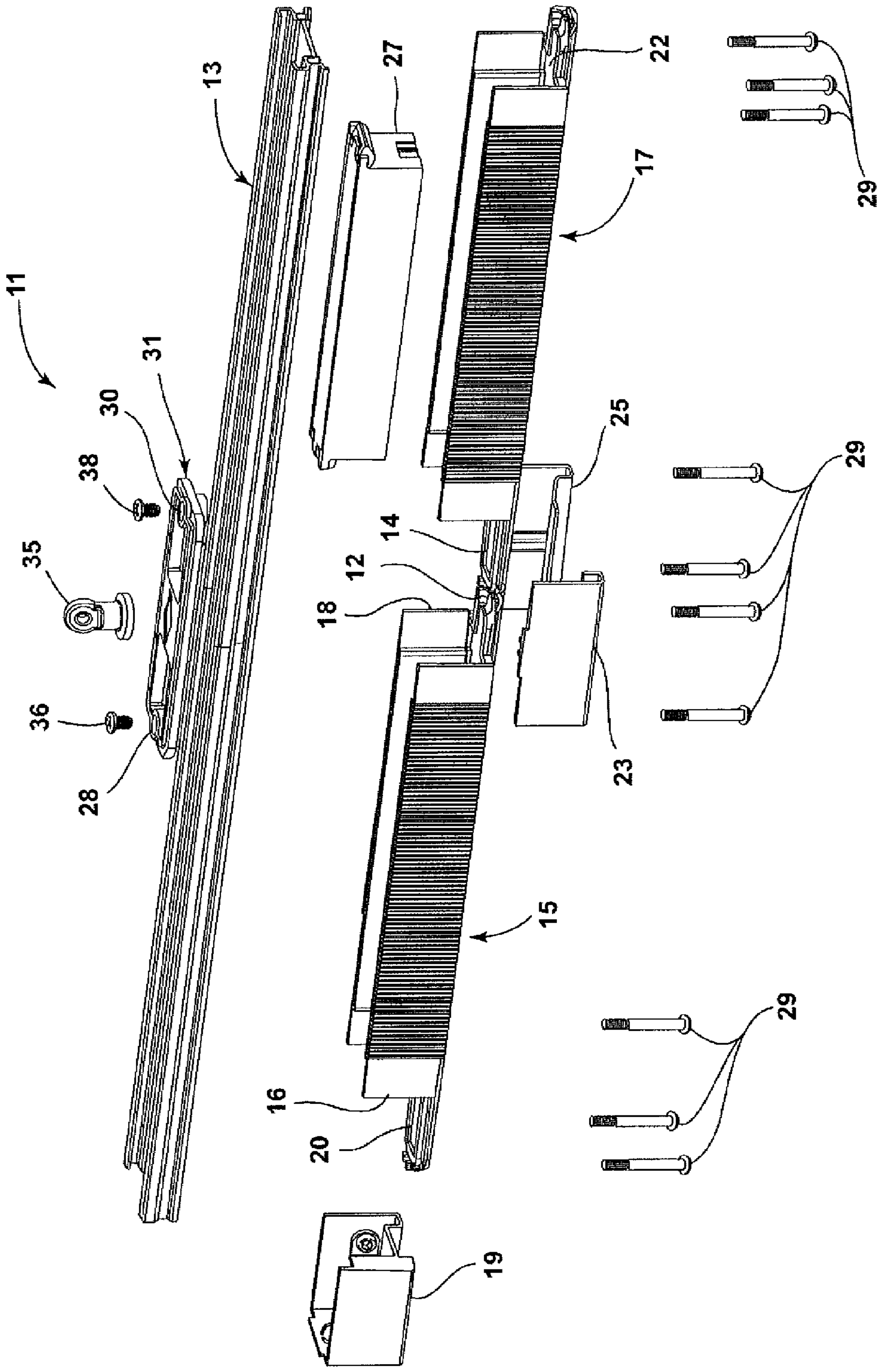
FIG. 2 is an exploded perspective view illustrating apparatus of FIG. 1.
Figure 18:
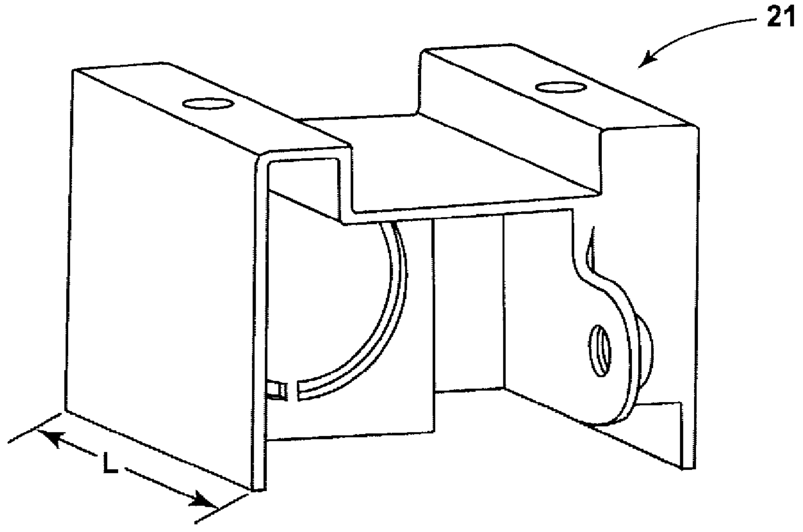
FIG. 18 is a perspective view of an illustrative embodiment of a second end junction box component.
Figure 19:
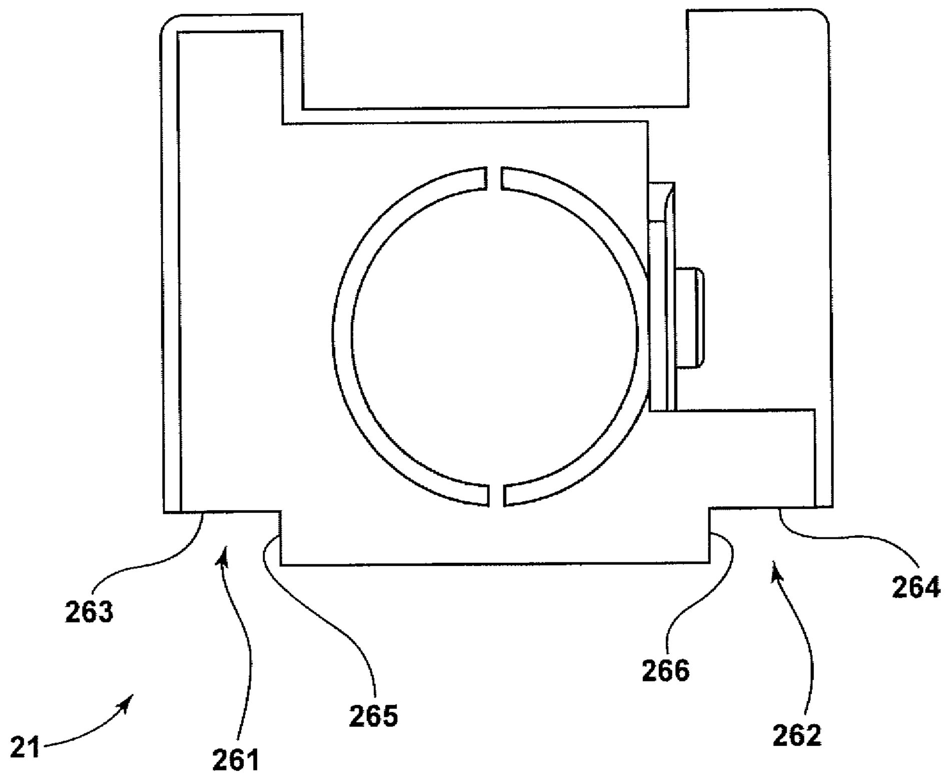
FIG. 19 is an end view of the junction box component of FIG. 18.
Figure 20:
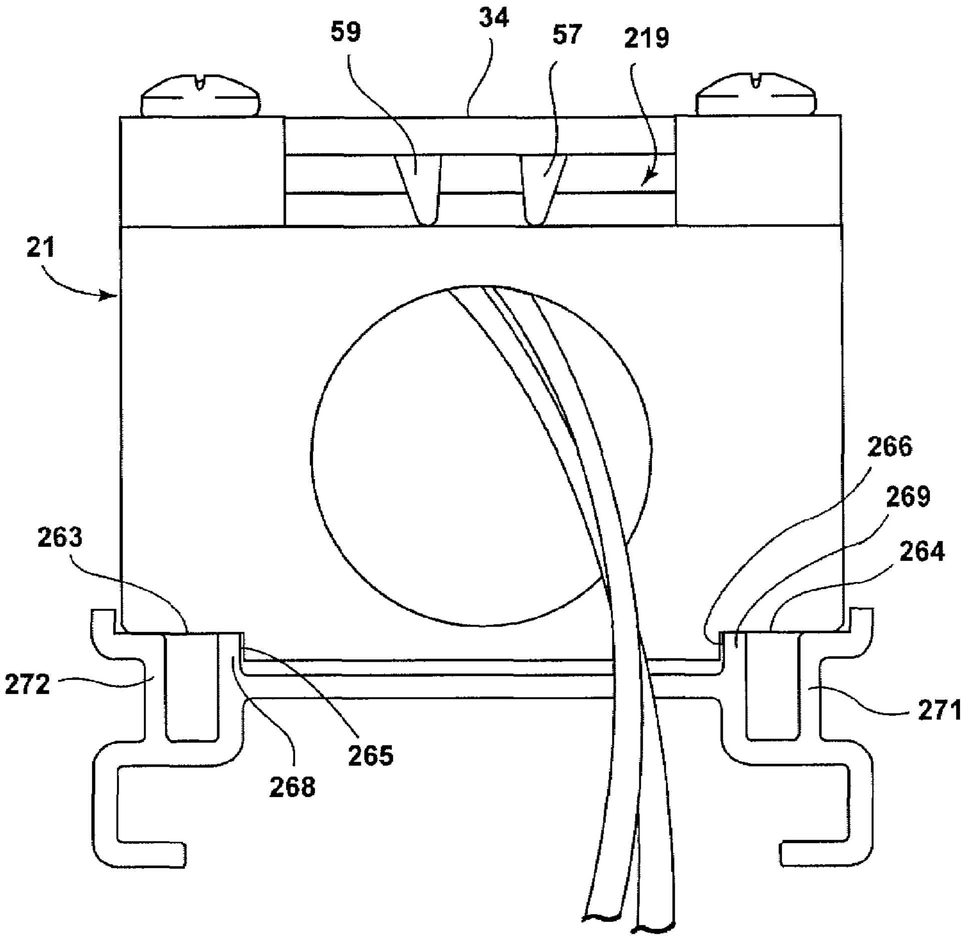
FIG. 20 is a view illustrating a junction box component in an assembled lighting apparatus embodiment.

FIG. 18 illustrates a second end junction box component 21, which is constructed in the same manner as component 19 of FIG. 15 with the exception that its length "L" is longer to accommodate a longer housing end tongue or tab 20, FIG. 2. As seen in FIG. 19, the component 21 has first and second corner channels 261, 262 with respective horizontal surfaces 263, 264 meeting at right angles with respective vertical walls 265, 266. As seen in FIG. 20, the vertical walls 265, 266 of the respective corner channels 261, 262 mate with respective inside rails 268, 269 of the guide track 13, while the horizontal surfaces 263, 264 rest on the horizontal surfaces of respective outer tracks 271, 272 and within the vertical side rails of those outer tracks 271, 272.

Figure 21:
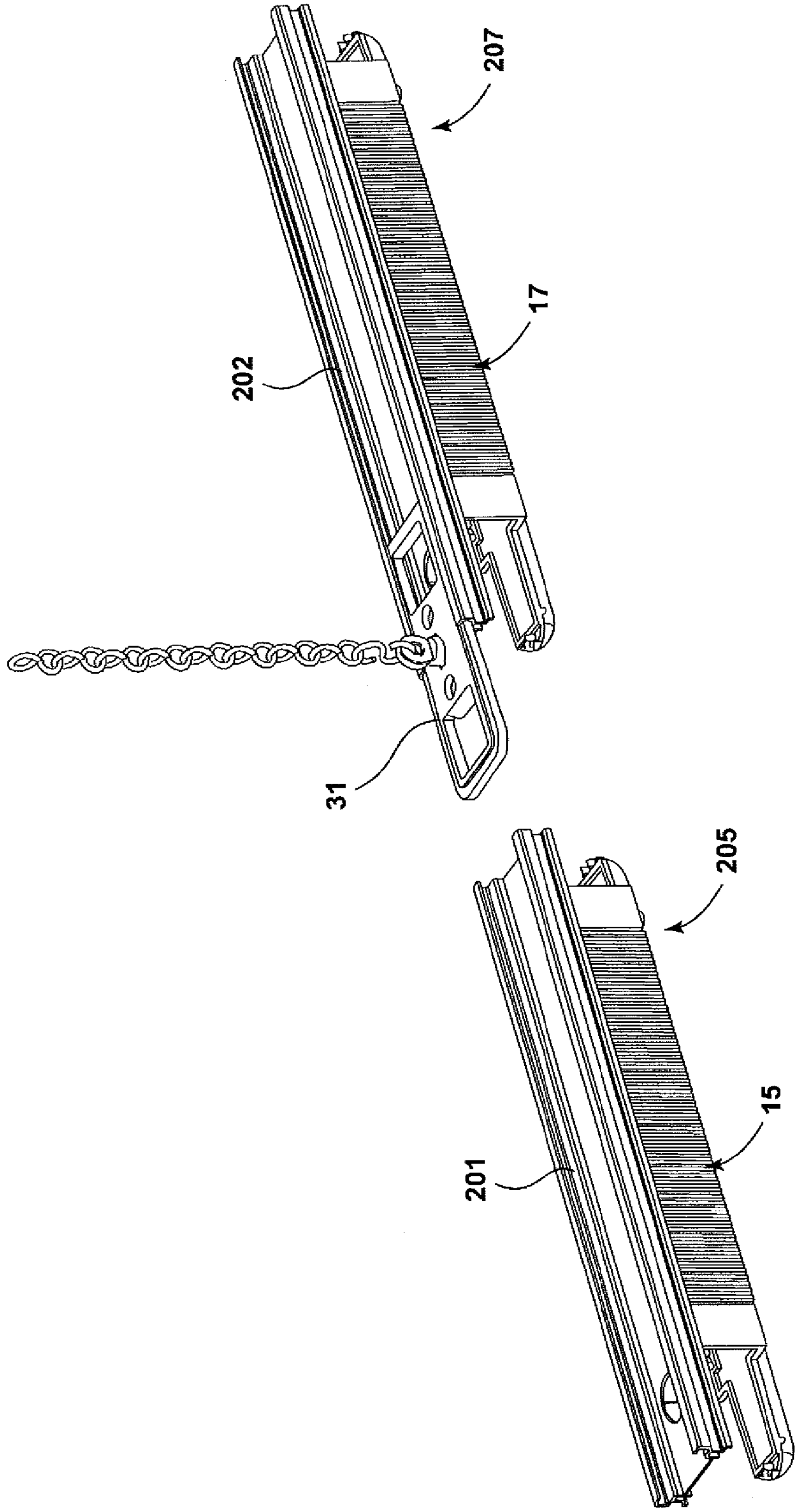
FIGS. 21-23 are perspective views useful in illustrating an illustrative manner of assembly of apparatus according to an illustrative embodiment.
Figure 23:
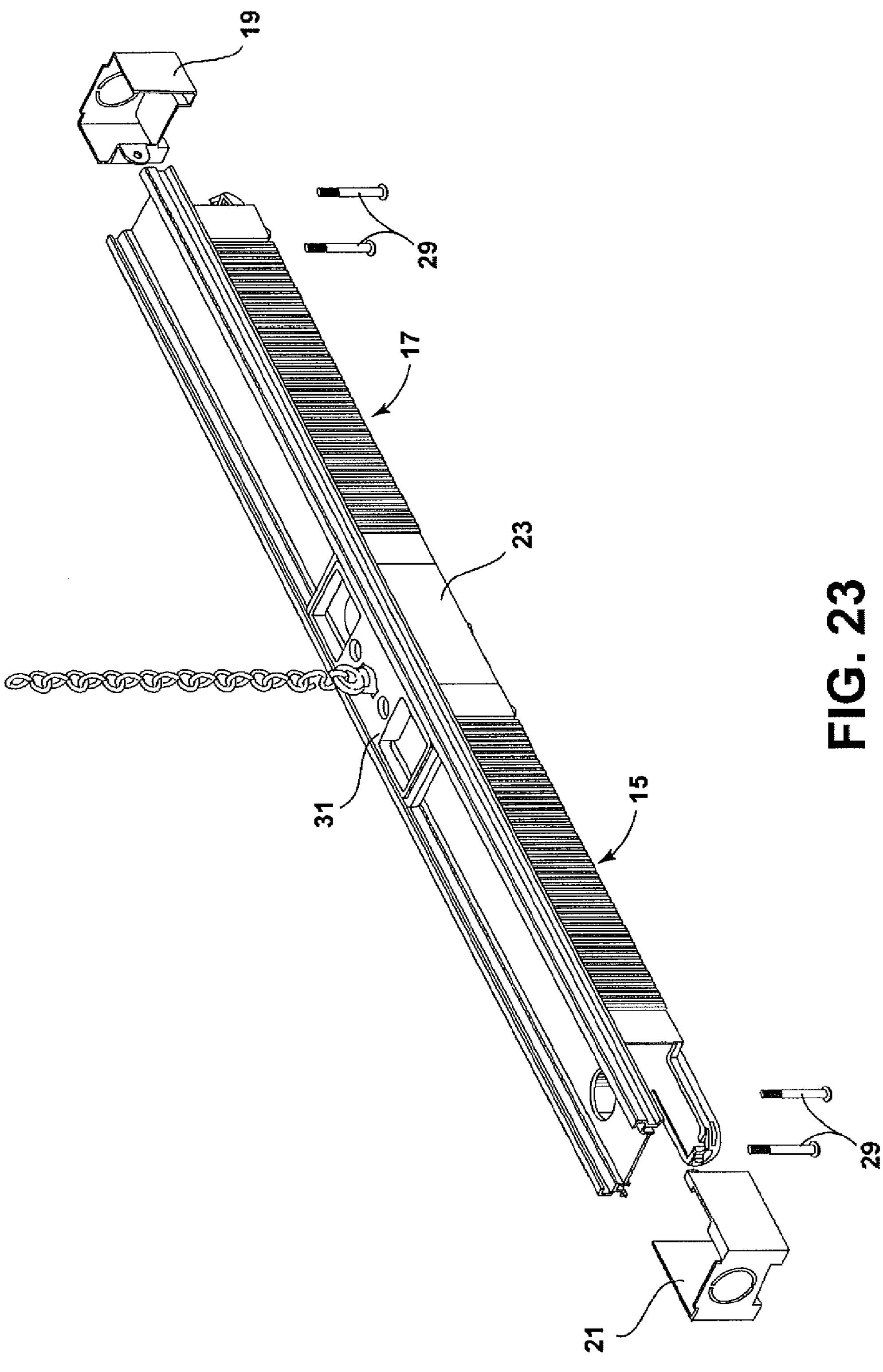
Figure 24:
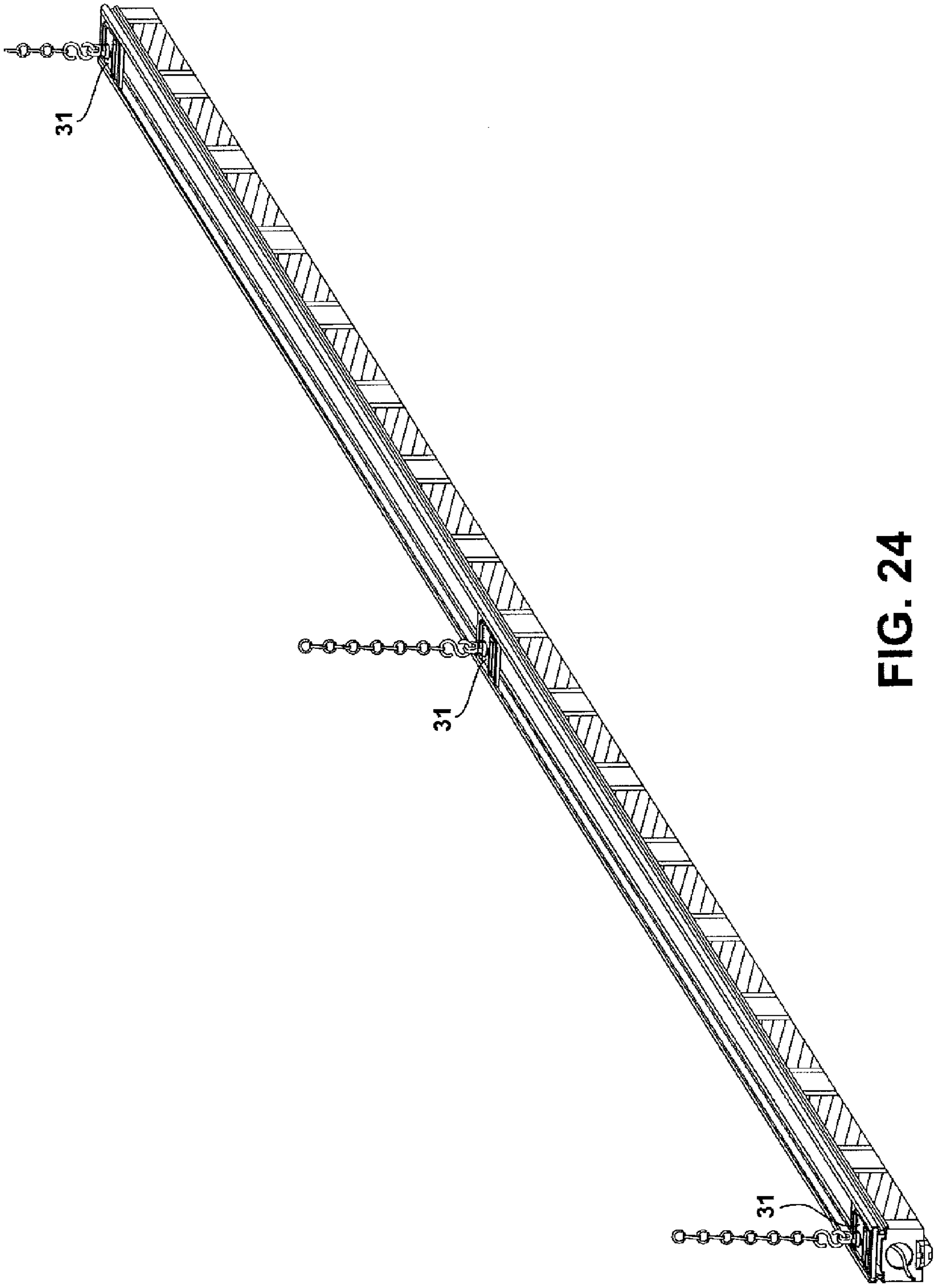
FIG. 24 is a schematic perspective view of a multiple module suspended LED light fixture embodiment employing three slip fitter components.

As illustrated in FIGS. 21-23, in assembling one illustrative embodiment, the lower housing components 15, 17, guide tracks 201, 202 side panels 23, 25, circuit cards e.g. 53, and lenses 32, 34 may be first respectively assembled together to form two separate modules 205, 207, with the driver component 27 attached in place using thermal tape applied between the driver component and the underside of the guide track, e.g. 201. In this assembly step, guide tracks 201, 202 are placed down onto the upper edges of the sides of the lower housing components 15, 17 such that respective lips 61, 63 on either side of the guide tracks 201, 202 fit down flushly on each respective lower housing side outer surface. The bolts 29 are then inserted through suitable holes and screwed into respective vertical channels 65, 67 of generally rectangular cross-section formed in the guide tracks 201, 202 below the horizontal channels 41, 43. In the embodiment shown, these vertical channels 65, 67 are suitably formed during the extrusion process so that bolts, screws or other fastening devices 29 are self-threading into the channels 65, 67, thereby avoiding the need to cut threads in the channels 65, 67. The slip fitter 31 may then be inserted into the respective guide tracks 201, 202 and fastened into place. Thereafter, the side panels 23, 25 and junction boxes 19, 21 are attached using suitable bolts 29. While the embodiment of FIG. 21 illustrates two guide tracks 201, 202, these guide tracks 201, 202 may be combined into a single piece component as illustrated in other figures.

Illustrative embodiments can produce high levels of light for both general ambient and accent light. Typical applications may include retail, manufacturing and warehouse facilities. Illustrative embodiments may comprise 1 foot, 4 foot, 6 foot, or 8 foot joined together modules, and may have, for example, either 4 or 6 LEDs per foot, producing 600 to over 1000 lumens per foot. A lightly frosted acrylic lens, e.g., 32, may be provided in certain embodiments. In illustrative embodiments, the LEDs may be 350 milliamps (ma) or 550 ma units. Certain embodiments permit long runs from a single power feed for ease of installation—120 feet @ 120 volts or 250 feet @ 277 volts power feeds are possible at virtually any point along a run. Electronic Low Voltage (ELV) dimming may be provided in some embodiments such that no additional control wires are necessary.

Figure 25:
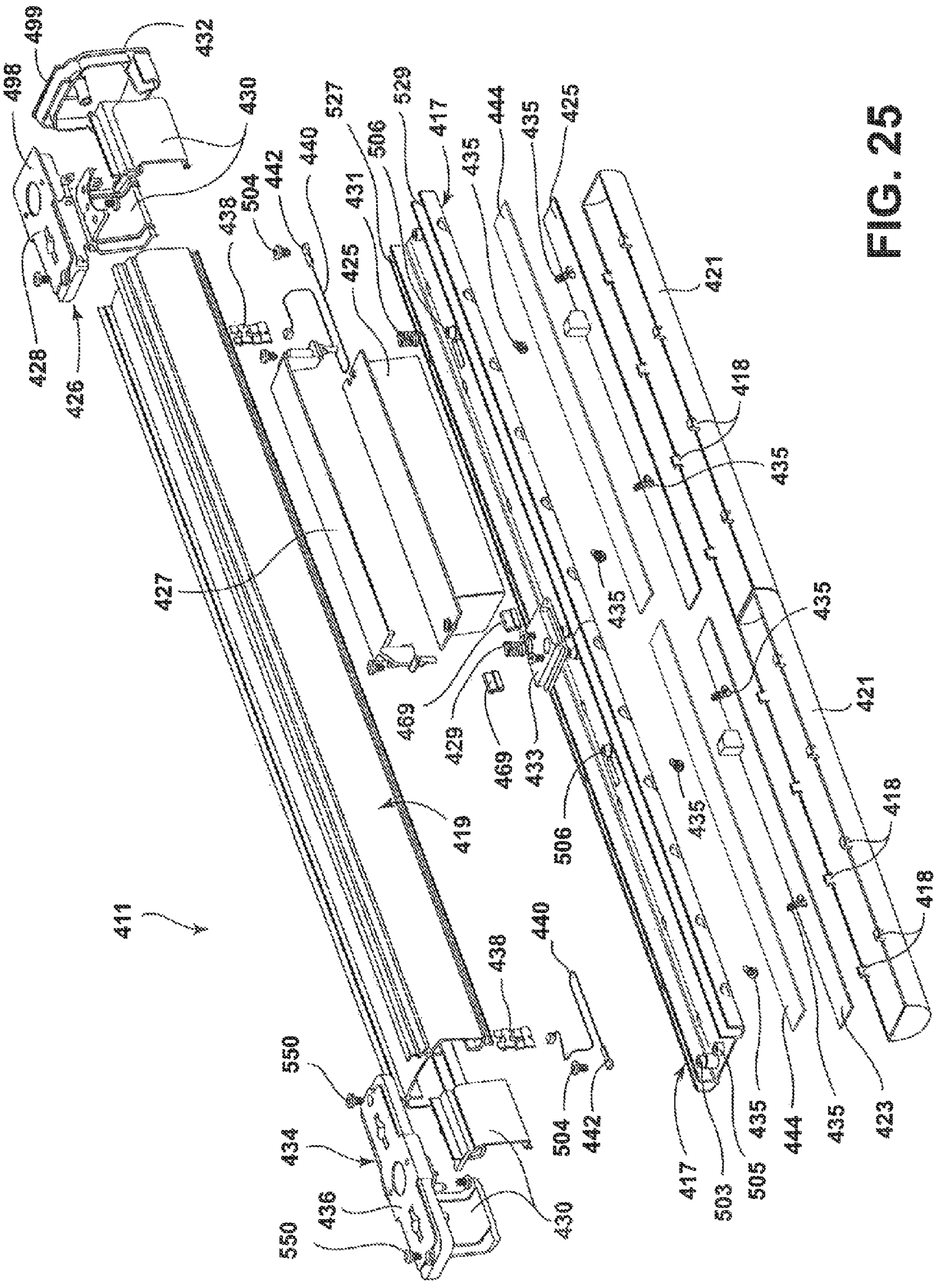
FIG. 25 is an exploded perspective view of a second illustrative embodiment.

FIG. 25 illustrates an exploded view of a second embodiment of a lighting platform 411, which includes first and second bottom covers 417, which attach to an upper housing 419. In one embodiment, each of these components 417, 419 may be fabricated of aluminum. In one illustrative embodiment, the bottom cover components 417 comprise two identical die cast clear anodized aluminum sections, while the upper housing 419 is a single piece aluminum extrusion, fabricated, for example, of 6063-T6 material with a clear anodized finish. Each bottom cover 417 includes first and second side channels 527,529.

Figure 29:
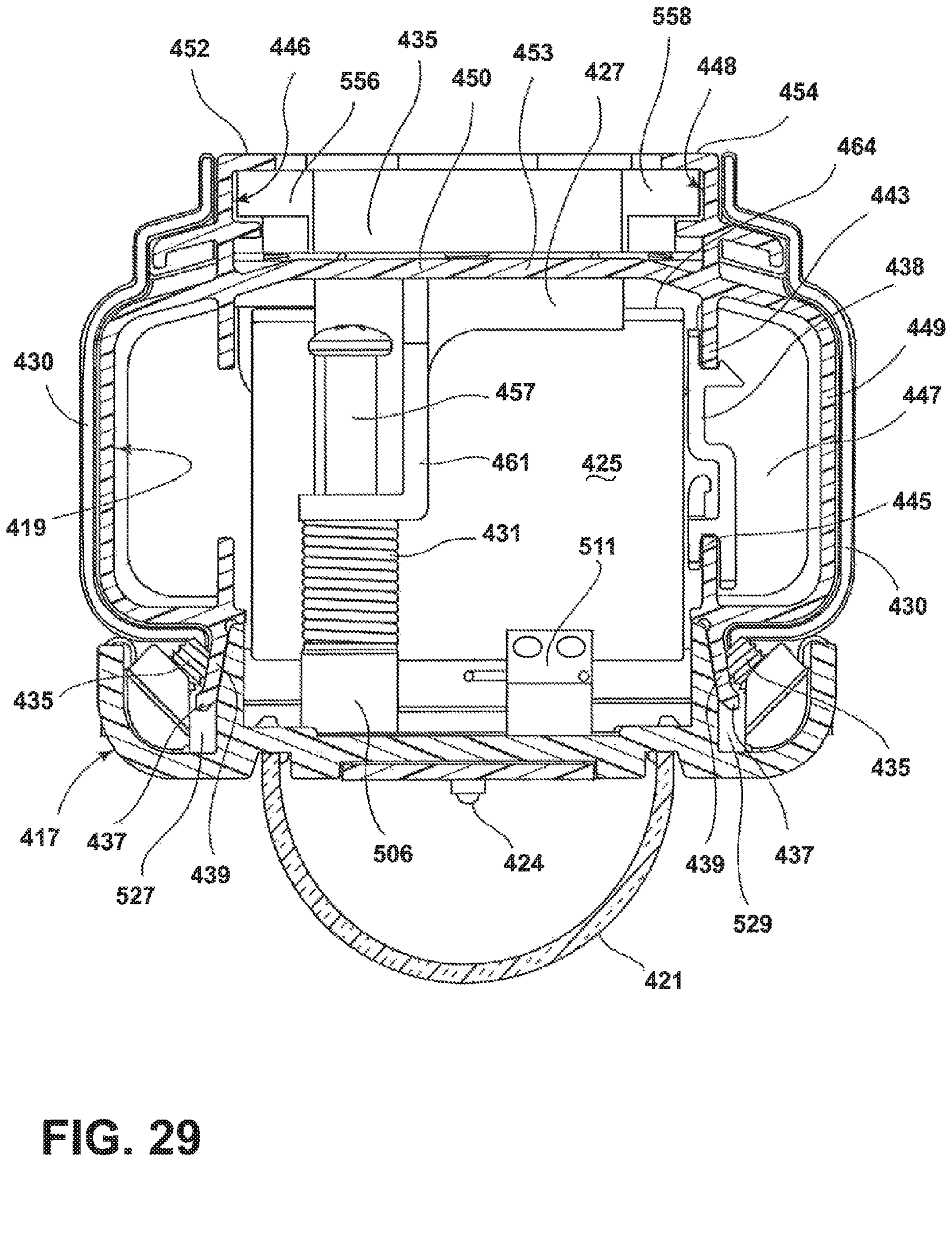
FIG. 29 is a cross-sectional view taken at V-V of FIG. 26.

A semicircular lens components 421 snaps in or otherwise attaches to each bottom cover 417. In the illustrative embodiments, side tabs 418 formed on the lens component 421 snap into corresponding apertures 420 (FIG. 30) formed in the bottom cover 417. The lens components 421 surround respective circuit boards 423 carrying one or more LEDs 424 (FIG. 29).

FIG. 25 further illustrates a driver unit 425 for powering the LEDs 424 and a driver mounting bracket 427, which are housed within the platform 11. The platform 11 further includes an end assembly 426 comprising an end slip fitter 428, respective right and left side clips 430, an end cover 432 and a central assembly 434 comprising a slip fitter 436 and respective right and left side clips 430. Other componentry shown in FIG. 25 includes wire management clips 438, edge clips 469, aircraft cable segments 440, stake eyes 442, Philips head screws 435 employed to fasten the bottom covers 417 to the upper housing 419, springs 429, 431, a splice clip 433, and double-sided thermal tape 444.

Figure 26:
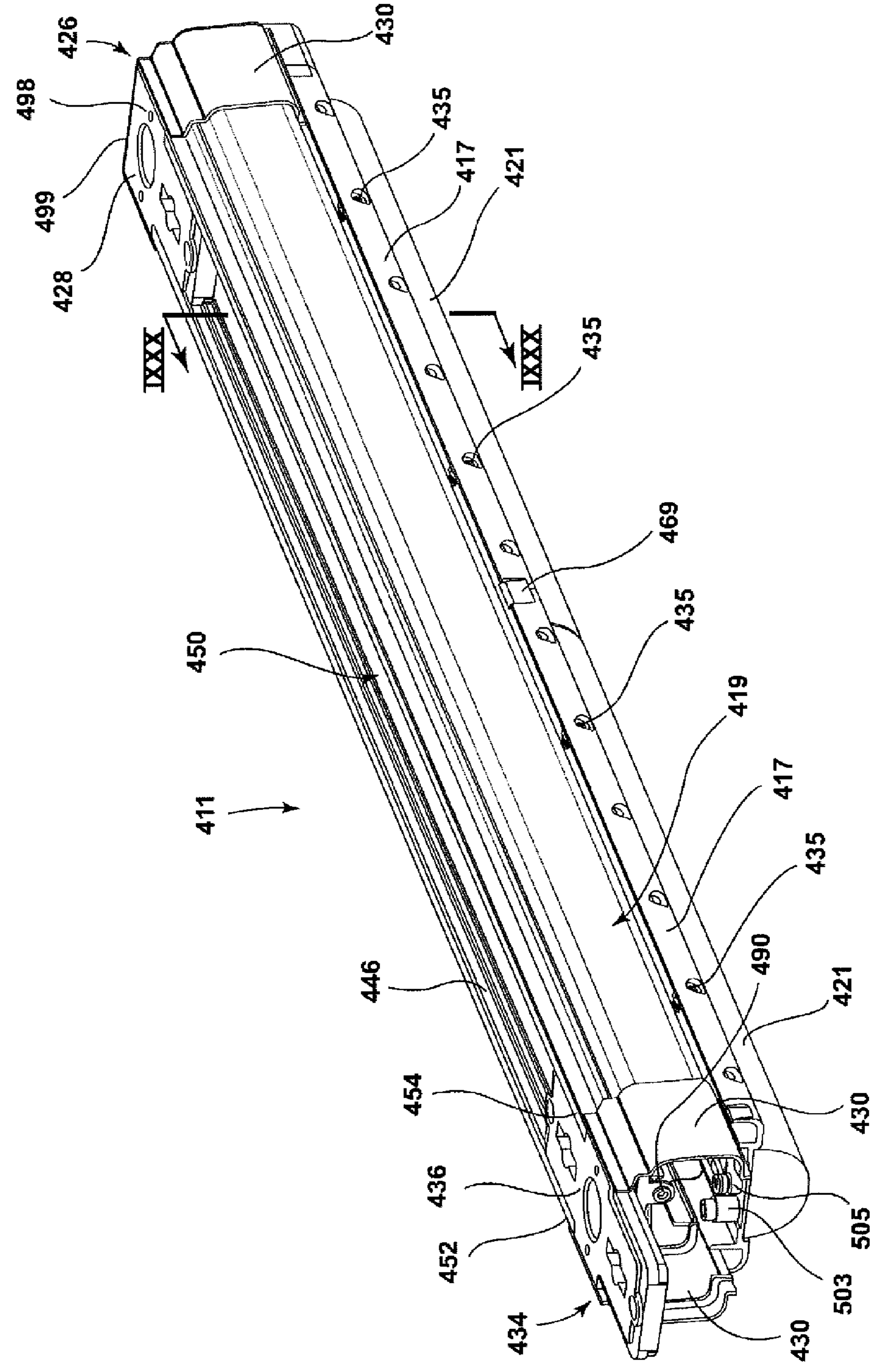
FIG. 26 is a perspective view of the embodiment of FIG. 25 in an assembled state.

FIG. 26 illustrates the apparatus of FIG. 25 in an assembled state. As can be seen, the central slip fitter 436 and end slip fitter 428 slide into side rails or channels 446, 448 formed on opposite sides of an upper surface 450 of the upper housing 411 and are retained in position by an upper lip 452, 454 of each side rail or channel 446, 448. The generally U-shaped edge clips 469 may be fabricated of spring steel and clip down over the ends of adjacent bottom covers 417 to cover the line of joinder of the units 417 and also indicate to a technician servicing the units that there are two components joined together at that point. Their primary function is thus to serve as a visual identifier for service personnel. Also visible in the view of FIG. 2 are a ground tab 490, and two bosses 503, 505.

Figure 27:
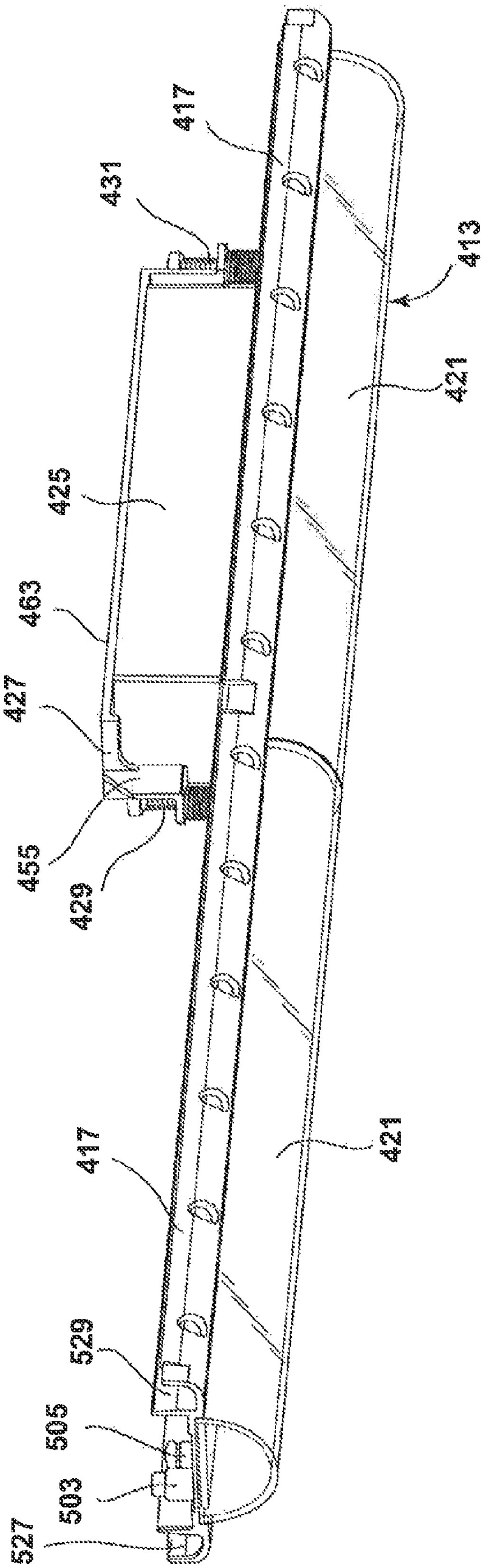
FIG. 27 is a side perspective view of the second embodiment with an upper housing component removed.
Figure 28:
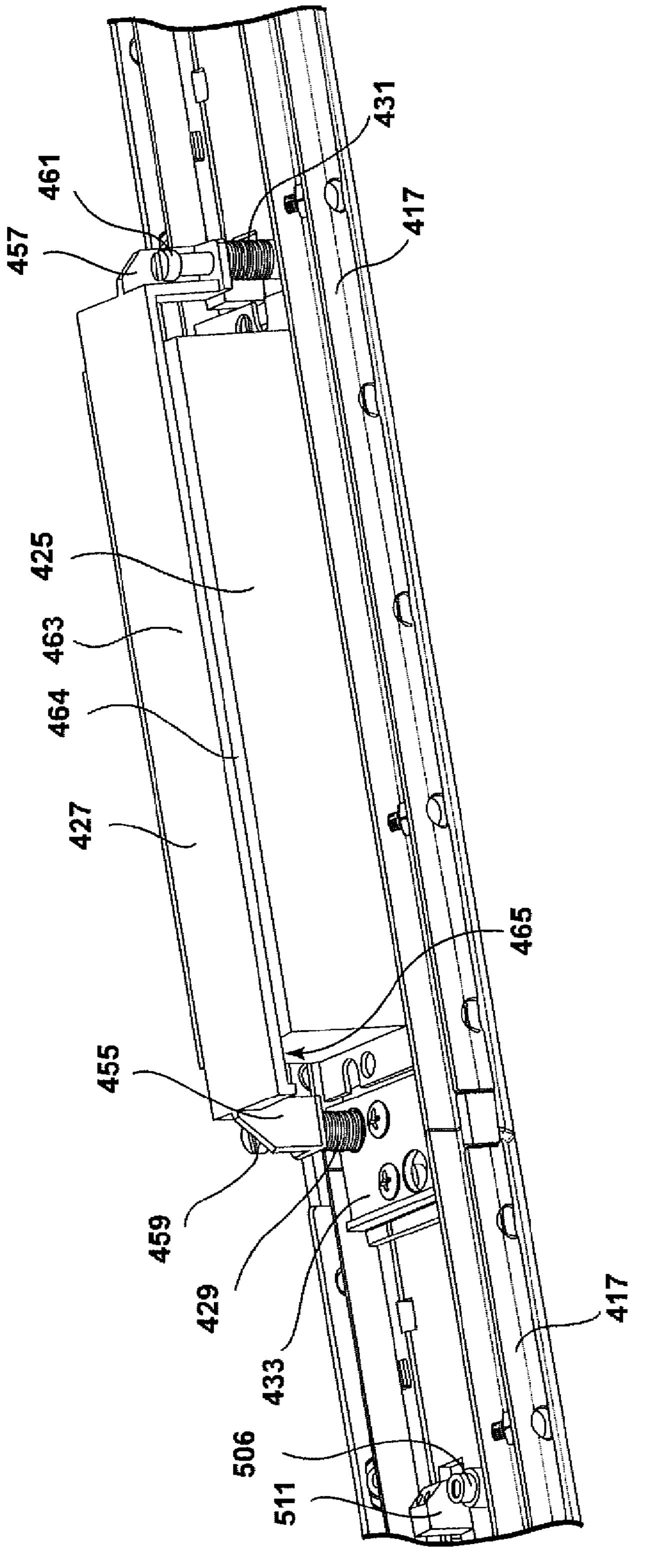
FIG. 28 is a downwardly looking perspective view of the assembly of FIG. 27.

FIGS. 27 and 28 illustrate the platform 411 with the upper housing 419 removed. As may be seen, the driver unit 425 for powering the LEDs 424 is positioned in a first of the bottom covers 417 and held in place by a driver bracket 427, which, in one embodiment, may be formed as a single piece die cast aluminum component. The driver bracket 427 is spring loaded by respective springs 429, 431, as will be described in greater detail below. FIG. 4 additionally illustrates the cover splice component 433, which is employed to attach together the adjacent bottom covers 417 via screws inserted through respective holes 517, 519 in the splice component 433 and threaded into each of the respective bottom cover sections 417. FIG. 28 further illustrates an electrical connector 511 which provides a power feed to a circuit board 423 and a boss 506.

As shown in FIG. 29, respective self threading screws 435 are angled and screwed into the upper housing extrusion 419 in order to fasten each bottom cover 417 to the upper housing extrusion 419 in manner which provides contact between the components 417, 419 which is tight enough to facilitate optimum heat transfer between the components 417, 419 for thermal management purposes.

In one embodiment, extended tips or "wings" 437 are provided on depending surfaces 439 of the upper extrusion 419. These tips 437 and surfaces 439 extend beneath the screws 435 and are shaped and dimensioned such that, if the bottom cover 417 is properly mated and aligned with the upper extrusion 419, the screws 435 will bite in and pull the units 417, 419 more tightly together, whereas, if they are misaligned the screws 435 will not bite and hold at all.

Figure 43:
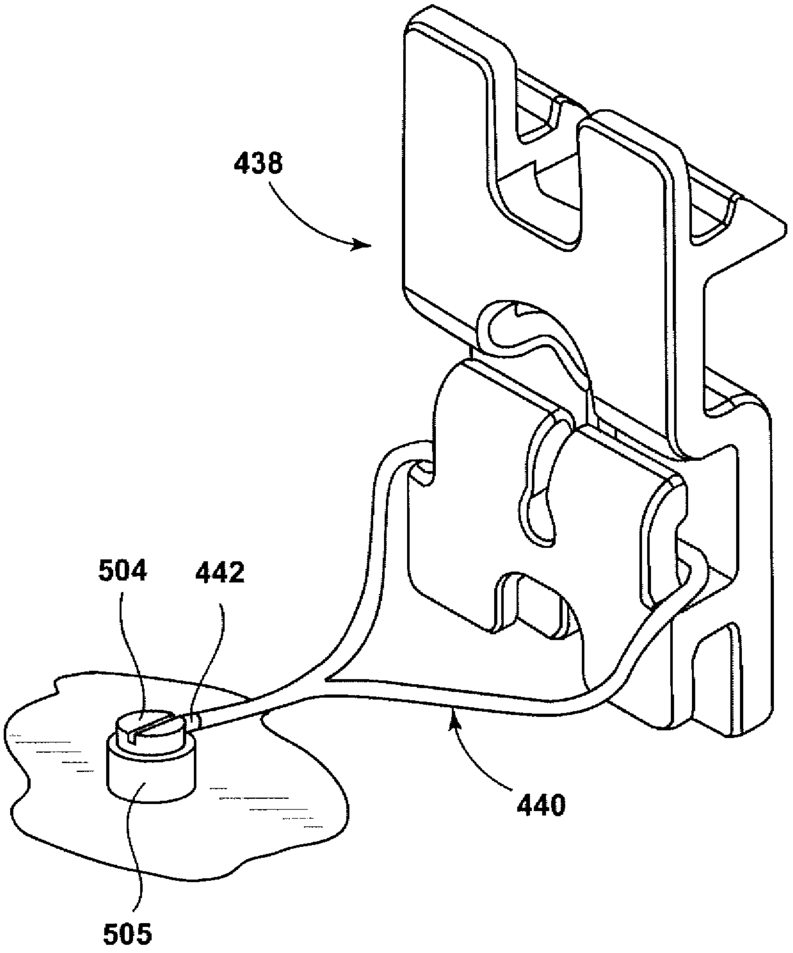
FIG. 43 is a schematic perspective view of one embodiment of wire management clip and associated cable suspension assembly.

As further shown in FIG. 29, in the interior of the lighting platform 411, a wire management clip 438 fits between respective vertical edges 443, 445 of the upper housing 419 and assists in defining a wire way 447 between the clip 438 and the outer right side 449 of the upper extrusion 419. In one embodiment, illustrated in FIG. 43, a loop of an aircraft cable segment 440 may be wrapped around respective fingers of the clip 438 and a screw 504 inserted through a stake eye 442 and into a boss 505 formed unitarily with the bottom cover 417. In another embodiment, a cable may be attached to the lower edge of a similar clip by a screw and similarly attached to a boss integrally formed with the bottom cover 417. In this manner, if the screws 435 are removed, e.g., for maintenance purposes, the bottom cover 417 will be suspended by the cable, rather than falling to the floor. In one embodiment, the clip 438 may be a rigid PVC material, but could be fabricated of different material in different embodiments.

FIGS. 27-29 further illustrate apparatus which forces the driver unit 425 upwardly to create firm contact with an upper horizontal surface 453 of the upper housing 419, to further facilitate heat transfer for thermal management purposes. In the illustrative embodiment, this apparatus includes the driver bracket 427 to which the driver 425 is attached and the first and second springs 429, 431 which are mounted on the interior floor of the casting 417, for example, around interior posts (not seen). The driver bracket 427 has suitable unitarily formed vertical flanges 455, 457 and bolts 459, 461, which extend through the flanges 455, 457 and attach bosses 503, 506 unitarily formed as part of the bottom cover 417.

In one embodiment, the top surface 464 of the driver unit 425 is attached to an undersurface 465 of the driver bracket 427 by double sided thermal adhesive tape. The springs 429, 431 are put in compression mode when the bottom cover 417 and upper housing 419 are attached together, thereby pressing the top surface 463 of driver bracket 425 against the horizontal surface 453 of the upper housing 419. In one embodiment, the driver unit housing itself could have flanges formed integrally or unitarily therewith or thereon to accommodate the bolts 459, 461, thereby eliminating the need for a driver bracket such as bracket 427.

FIG. 29 further illustrates that the upper housing extrusion 419 has respective sidewardly facing oppositely disposed inner u-shaped channels 446, 448 suitably formed at the top thereof to receive respective wings 556, 558 of the slip fitter components, e.g., 436. The slip fitter components 436, 428, may accommodate various suspension or hanging mechanisms, for example, such as those shown in FIGS. 1, 2, 6-15 and 24. For example, a jack chain mounting component similar to component 35 may be threaded into openings such as a threaded opening, e.g. 588, of the slip fitter components 428, 436. Keyed mounting or suspension brackets similar to bracket 33 can be attached using slots such as 535, 537 in the slip fitters 428, 436. In one embodiment, the slip fitters 428, 436 may be fabricated of die cast aluminum.

Figure 30:
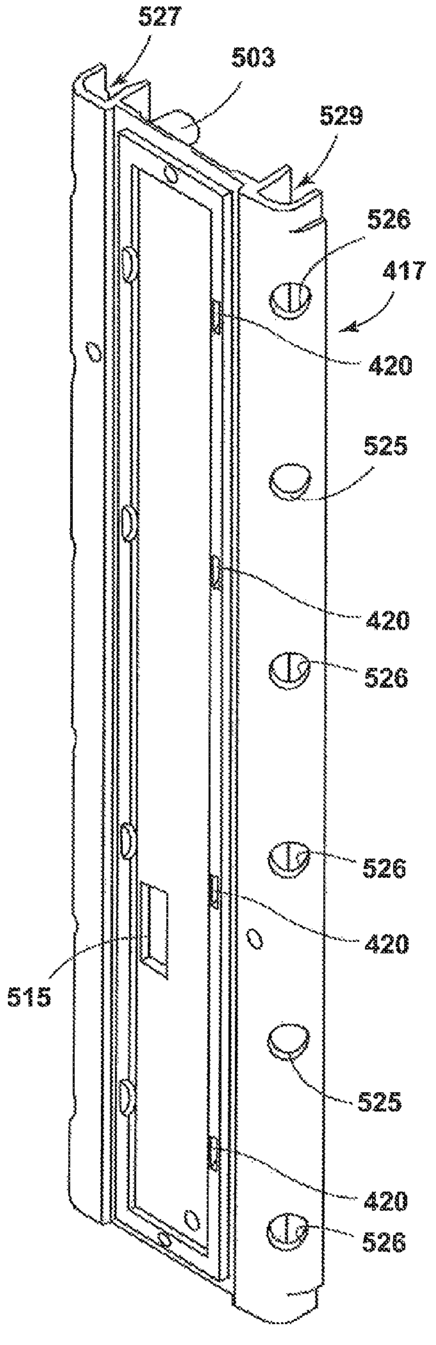
FIG. 30 is a side perspective view of a bottom cover component of the second illustrative embodiment.
Figure 31:
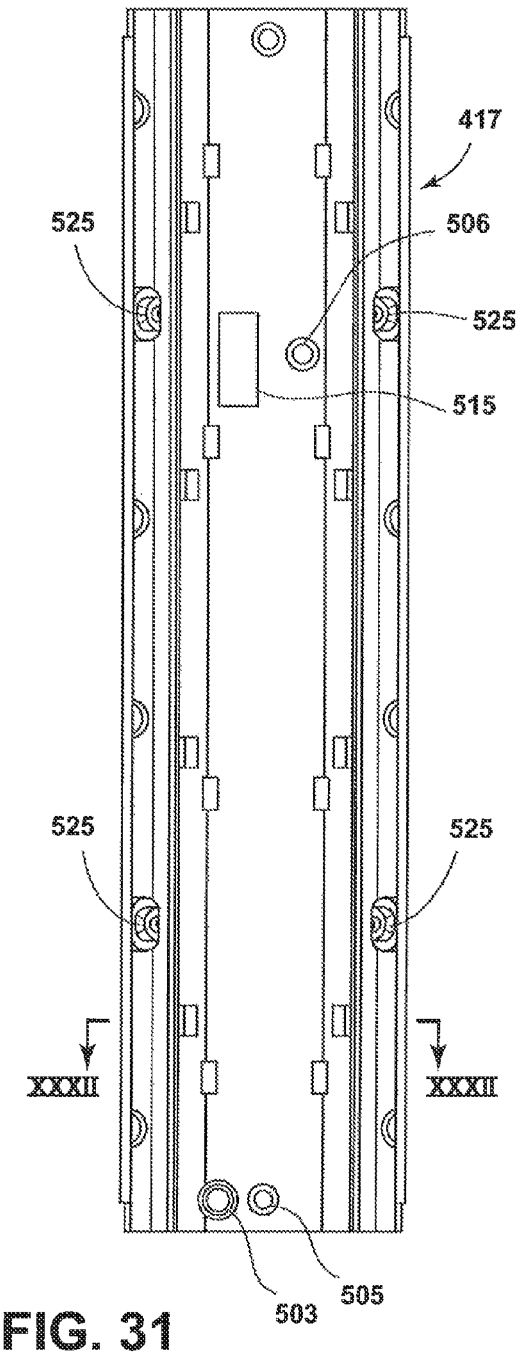
FIG. 31 is a top view of the component of FIG. 30.
Figure 32:
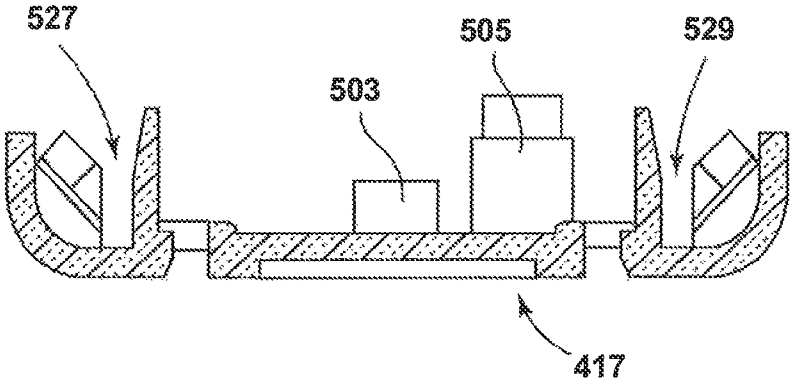
FIG. 32 is a cross-sectional view taken at VIII-VIII of FIG. 31.

FIGS. 30-32 further illustrate the bottom cover extrusion 417 and bosses 503, 505, 506 integrally formed therewith. Each side of the bottom cover 417 has respective circular holes 525 and screw holes 526 formed therein.

Figure 33:
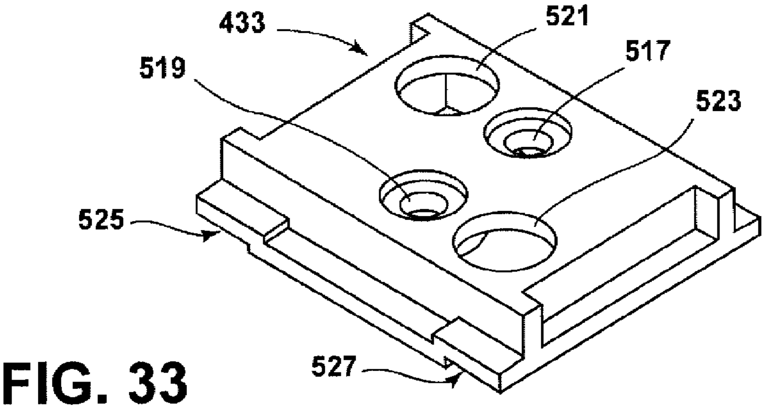
FIG. 33 is a perspective view of a cover splice component of the second illustrative embodiment.
Figure 34:
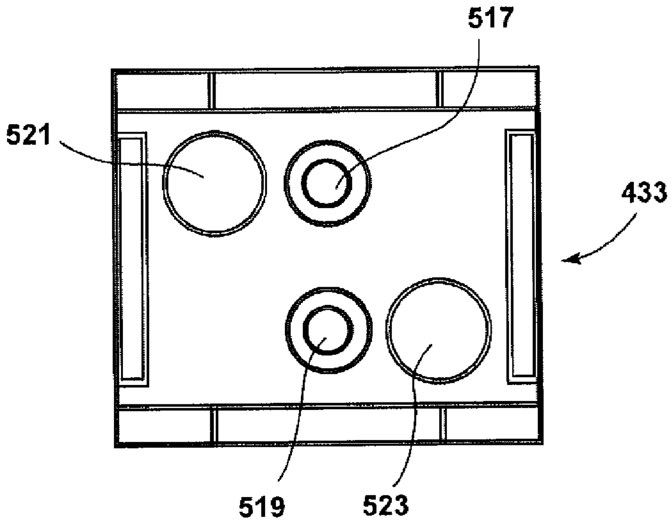
FIG. 34 is a top view of the component of FIG. 33.
Figure 35:
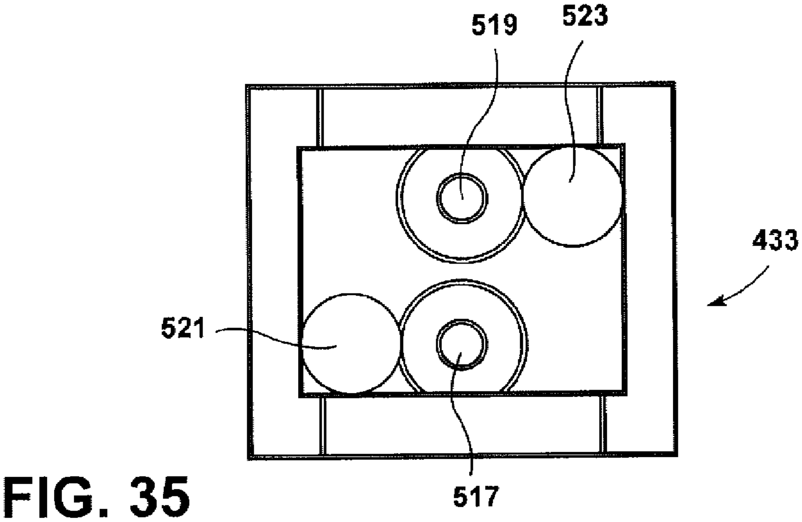
FIG. 35 is a bottom view of the component of FIG. 33.

FIGS. 33-35 illustrate the cover splice component 433, which, in one embodiment, may be fabricated of die cast aluminum. As shown, the splice component 433 is provided with screw holes 517, 519 and cylindrical holes 521, 523, through which boss 503 may pass to receive a bolt 429. Slots 525, 527 accommodate the contour of the bottom cover 417 to which splice component 433 is attached.

Figure 36:
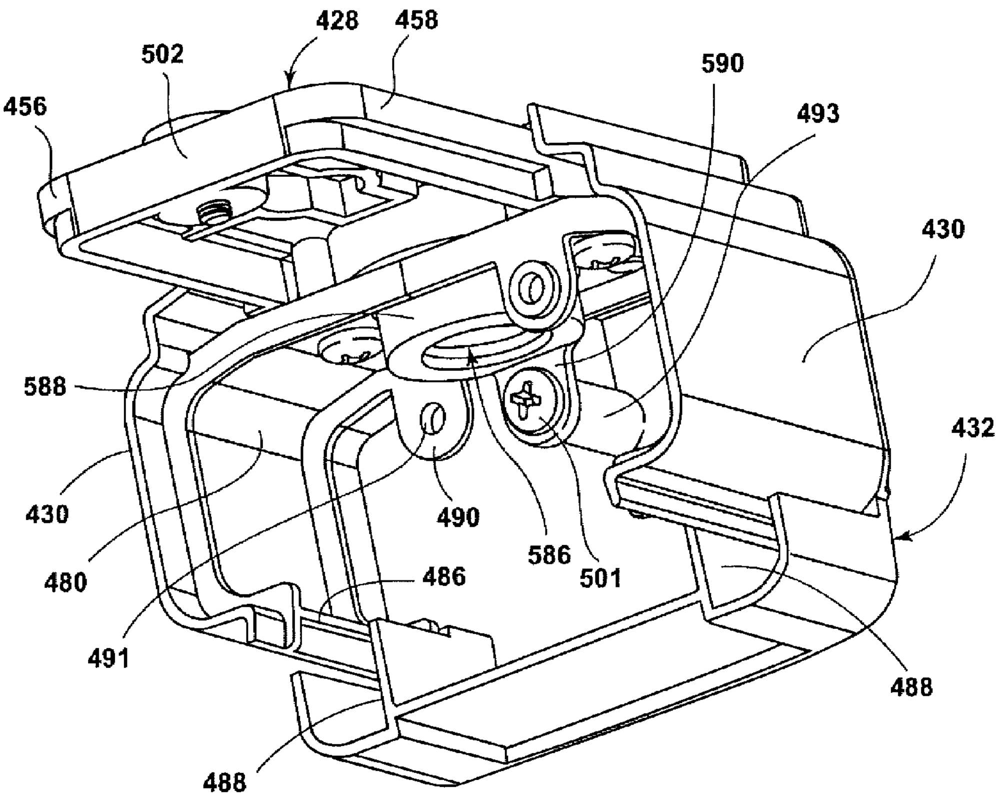
FIG. 36 is a perspective view of an end assembly of the second illustrative embodiment.

FIGS. 36-41 further illustrate the end assembly 426 of the illustrative embodiment. As may be seen, the left and right side clips 430 slidably mate with the end cover 432. In particular, the upper vertical edge surface 462 and downwardly angled lower surface 464 (FIG. 38) beneath slide into and mate with a conforming vertical side surface or edge 466 and downwardly angled lower surface 468 (FIG. 40) of the end cover 432. The generally flat horizontal and vertical back surfaces 470, 476 (FIG. 38) of each side clip 430 abut respective horizontal and vertical edge surfaces 472, 484, formed on the end cover 432 and are shaped and dimensioned to flushly mate with those surfaces 472. The back surface 470 is formed on a flange 478 (FIG. 37), which extends horizontally and inwardly. Finally, as shown in FIG. 36, a lower horizontal interior side edge 486 on each side of the clip 430 abuts, touches or engages an interior vertical lip 488 formed on each side of the end cover 432.

Figure 37:
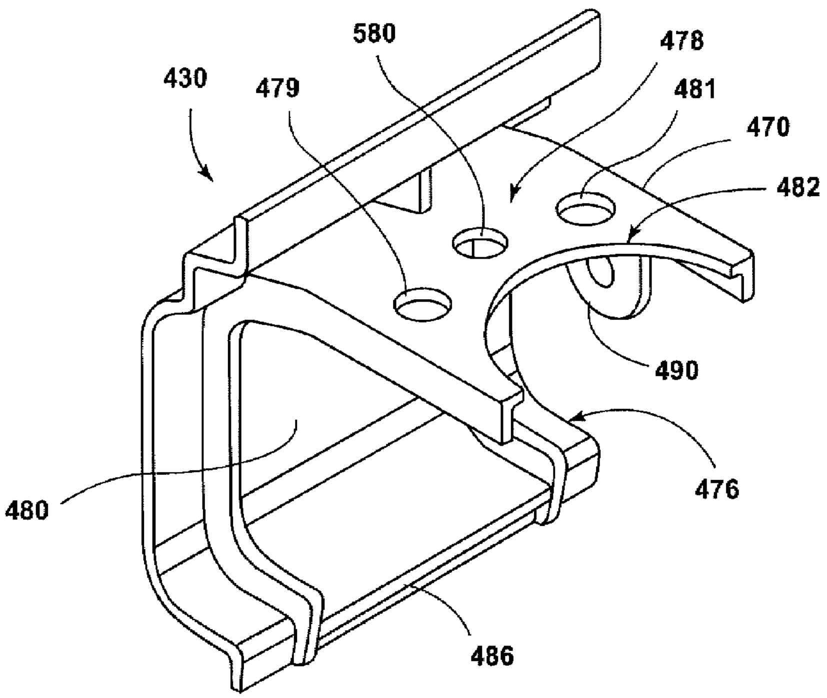
FIG. 37 is a perspective view of a side clip component of the second illustrative embodiment.
Figure 38:
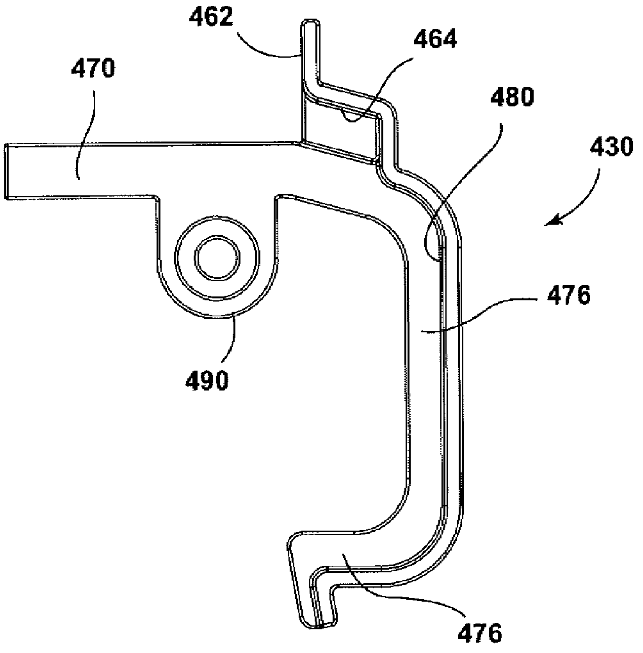
FIG. 38 is an end view of the component of FIG. 37.
Figure 39:
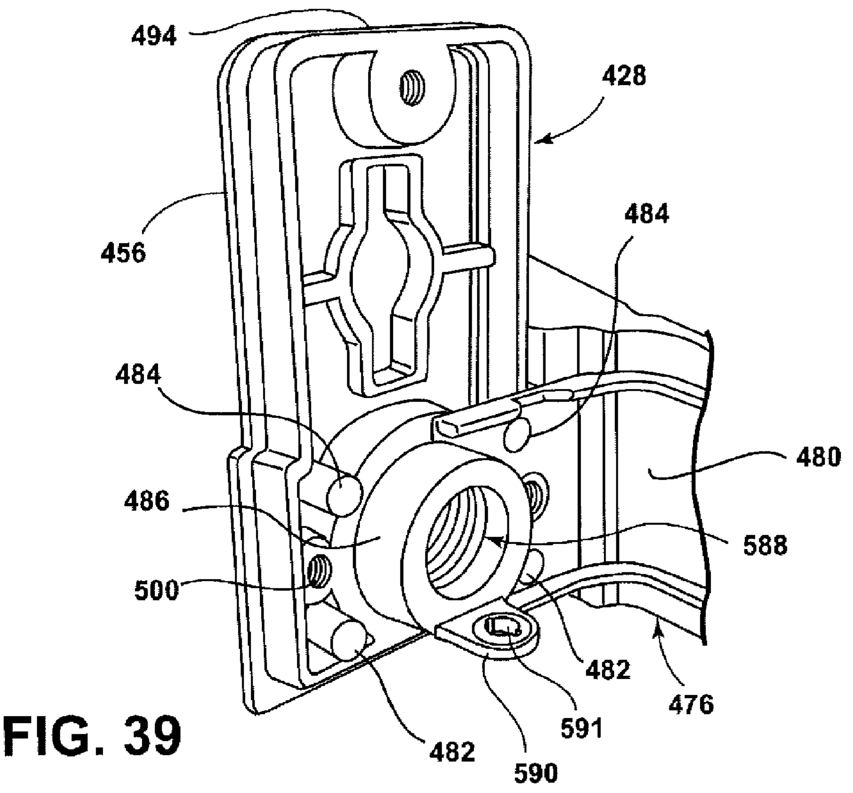
FIG. 39 is a partial perspective view illustrating assembly of the end assembly of FIG. 36.

As shown, for example, in FIG. 37, the inwardly projecting horizontal flange 478 of the side clip 430 has three holes 479, 580, 481 formed therein and a central semicircular cut-out or opening 482. As illustrated in FIG. 39, the side holes 479, 481 receive respective plugs 482, 484 formed on the underside of the end slip fitter 428, while the semicircular opening 482 is sized to slidably receive and mate with the circular cylindrical outer surface 486 of the central threaded plug 588 of the end slip fitter.

Figure 40:
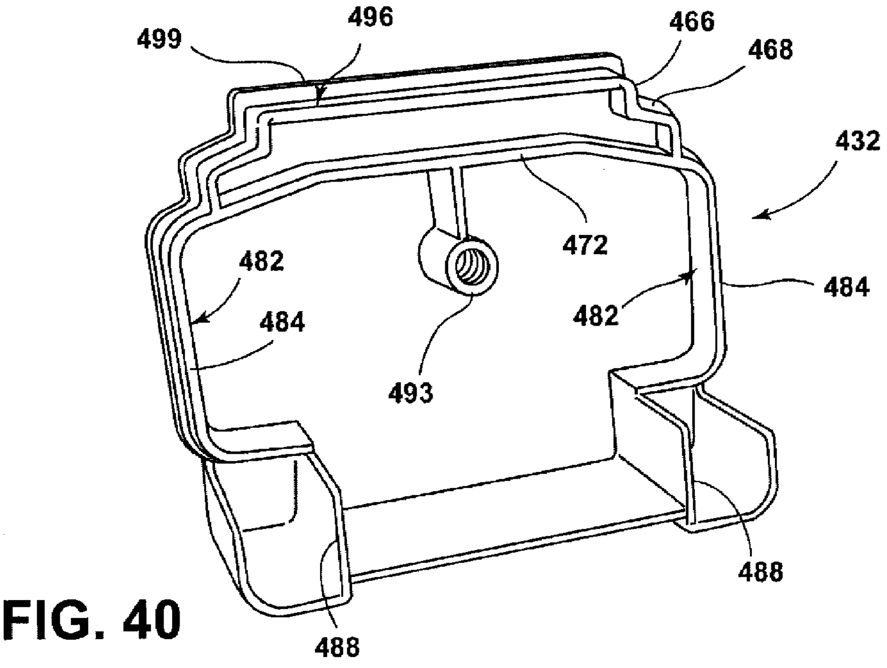
FIG. 40 is a first perspective view of an end cover component of the second illustrative embodiment.
Figure 41:
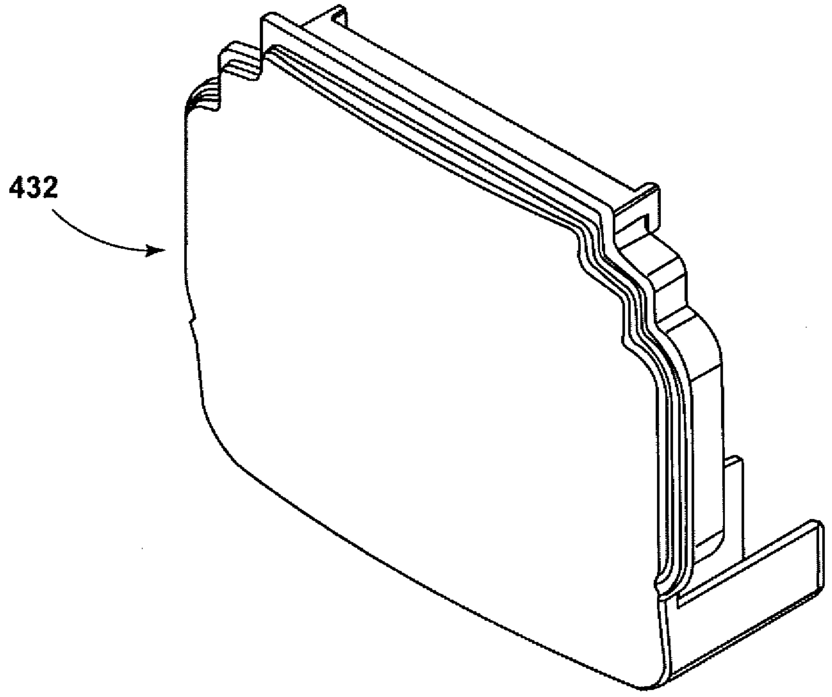
FIG. 41 is a second perspective view of the end cover component.

As seen in FIGS. 36 and 39, the circular plug 588 of the slip fitter 428 has a vertically depending tab 590 formed thereon, which includes a hole 591 which receives a screw 501 which threads into a horizontally extending boss 493 formed as part of the end cover 432 to thereby attach the end slip fitter 428 to the end cover 432. As shown in FIGS. 39 and 40, the rear slip fitter 428 includes a rear horizontal lip 494 which is shaped and dimensioned to slide onto and over a mating horizontal lip 496 formed on the end cover 432. As seen in FIG. 26, the lip 494 and mating lip 496 are so shaped and dimensioned that the top surface 498 of the end slip fitter 428 flushly mates with the upper horizontal edge 499 of the end cover 432.

The central holes 580 formed in the horizontal flange of the clips 430 permit screws to be inserted into respective holes, e.g., 500, in the underside of the end slip fitter 428 to thereby attach the clips 430 to the end slip fitter 428. In assembly, in one embodiment, the clips 430 are first attached to the end slip fitter 428 using screws, and the slip fitter and clips subassembly is then inserted into the end cover 432 and screwed in place using a screw 501, as illustrated, for example, in FIG. 36. As will be observed, the inner end 502 of the end slip fitter 428 extends beyond the clips 430 and is shaped and dimensioned such that its side projections or wings 456, 458 mate with the guide track or channels 446, 448 formed on the upper housing, in the same fashion as the central slip fitter 434.

Figure 42:
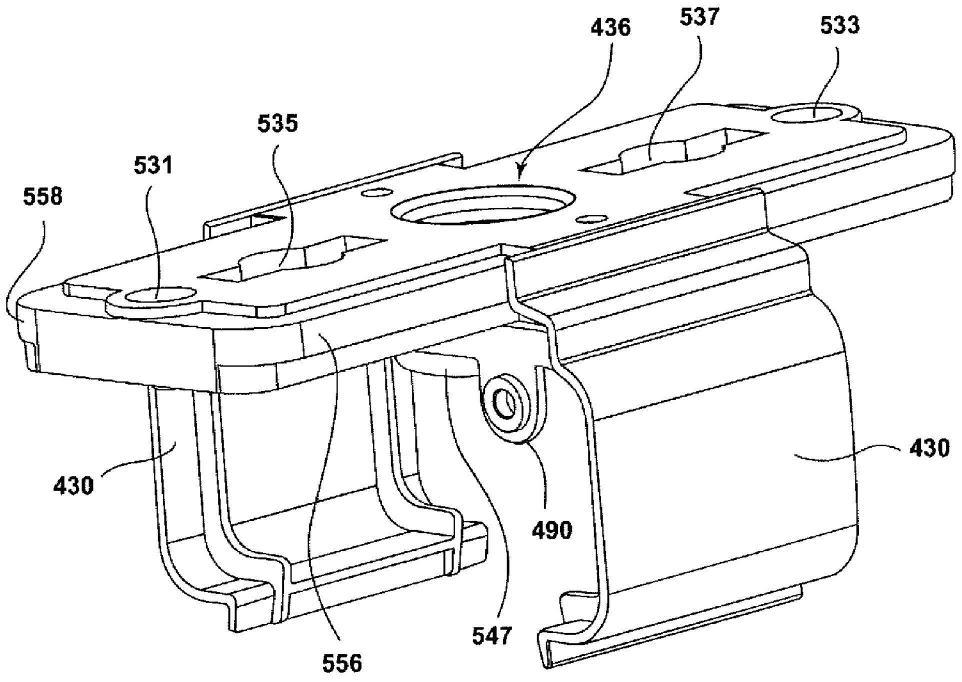
FIG. 42 is a perspective view of a central slip fitter assembly according to the second illustrative embodiment.

With respect to in FIG. 42, respective side clips 430 are attached to the central area of the central slip fitter 436 in the same manner as the side clips 430 are attached to the end slip fitter 428, i.e. employing two pegs and matching holes and a central screw hole, e.g. as shown in FIG. 39. The design of the illustrated embodiment thus permits each end clip 430 to have identical structure, which is advantageous in reducing part count and manufacturing cost.

Figure 47:
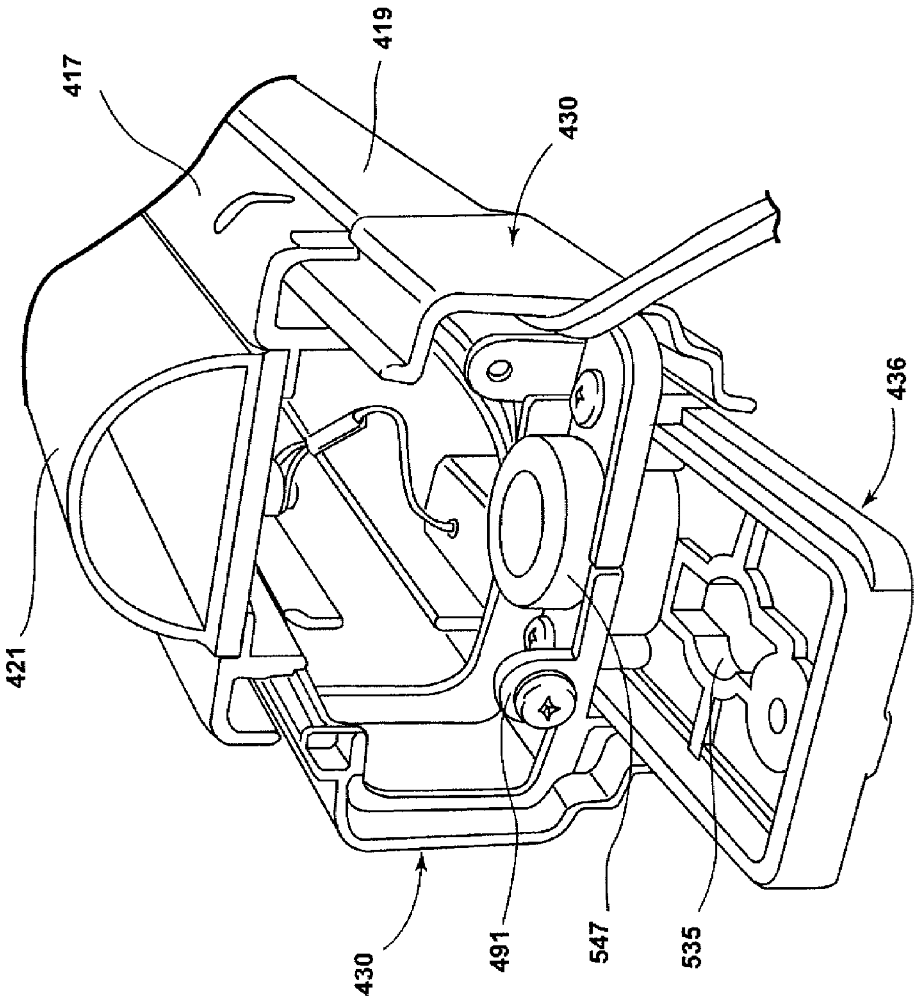
FIG. 47 is an end perspective view of the second illustrative embodiment useful in illustrating the manner of assembly of additional light fixture units or modules according to the second illustrative embodiment.
Figure 48:
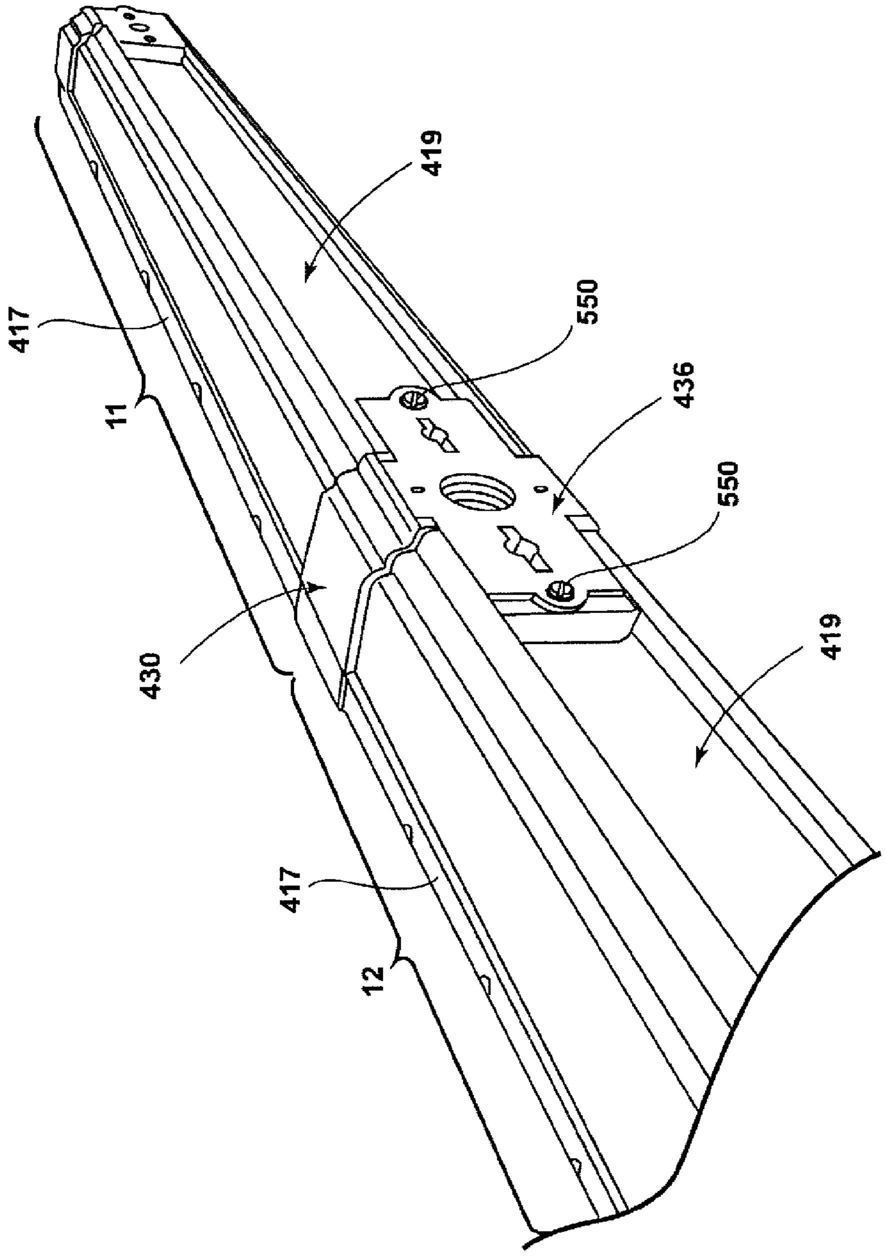
FIG. 48 is a perspective view illustrating first and second light fixture units or modules assembled together according to an illustrative embodiment.

As illustrated in FIGS. 47 and 48, a second unit 12 comprising an upper housing extrusion 419 and bottom cover(s) 417 may be joined to the first unit 11 depicted in FIG. 25 using the slip fitter 436 and side clips 430. As shown, when attached to the first unit 11, the end of the slip fitter 436 extends beyond the end of the upper extrusion 419 and bottom cover 417 of the first unit 11, as does a portion of each of the side clips 430. The second unit 12 may then simply be slid into the slip fitter 436 and side clips 430 and the screws 550 tightened down against the top surfaces 450 to hold the units 11, 12 together. The left-most end of the unit 12 may be closed by attaching another end assembly 426. The side clips 430 function to provide an aesthetically pleasing appearance by covering gaps between the units 11, 12 and accommodating any "slop" or slightly off tolerances between the two units 11, 12. More units such as 11, 12 may be joined together to form even longer light fixture assemblies such as 4, 6 and 8 foot lengths, which can replace T5, T8, or T12 fluorescent fixtures and various other conventional lamps in various environments such as grocery stores, garages, high end retail and convention centers. In one embodiment, the side clips 430 and end covers 432 may be die cast aluminum parts.

Figure 46:
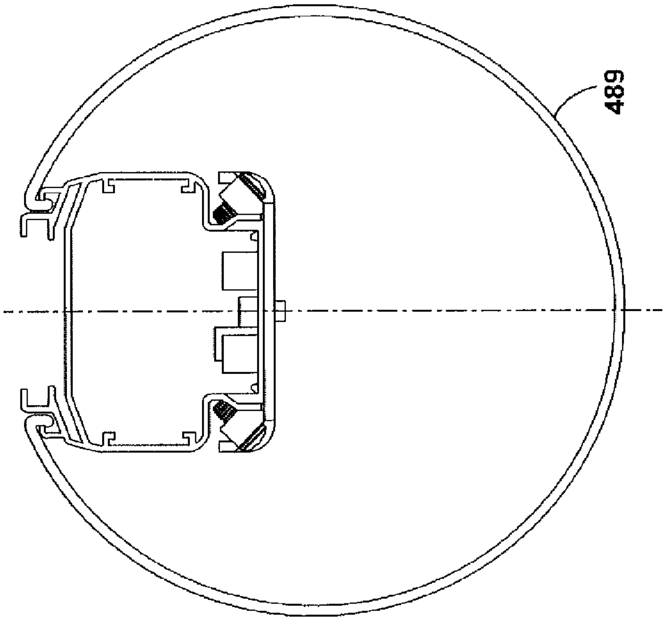
FIGS. 44-46 are end views illustrating various lens attachment mechanisms according to illustrative embodiments.
Figure 45:
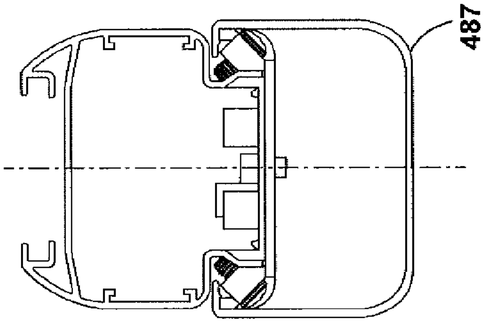
Figure 44:
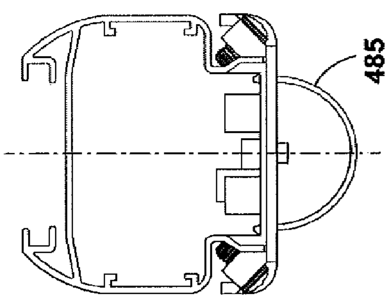

It may be noted that, in various embodiments, the upper housing 419 may have one or more built-in lens attachment mechanisms. One of these mechanisms may comprise a pair of downwardly facing u-shaped channels 473, 475 at respective upper corners of the extrusion 419, while another may comprise respective openings 477, 479 on each side of the lower end of the upper extrusion 419. A third mechanism comprises channels 481, 483 formed on the bottom surface of the casting 417. FIGS. 44-46 illustrate lenses 485, 487 (rectangular), 489 (wrap around tube) respectively installed using these mechanisms to create three different types of fixtures.

Those skilled in the art will appreciate that various adaptations and modifications of the just described illustrative embodiments can be configured without departing from the scope and spirit of the invention. For example, various materials have been specified above for fabricating illustrative embodiments, and such materials may of course be different in different embodiments. Therefore, it is to be understood that, within the scope of the appended claims, the invention may be practiced other than as specifically described herein.

What is claimed is:

1. A lighting platform mounting one or more LEDs comprising:

a first bottom cover having respective first and second side channels formed at opposite corners thereof, the first and second side channels each comprising a horizontal bottom edge curving into a vertical side edge;

an upper housing having respective outer side surfaces which, at respective upper ends thereof, extend outwardly, then vertically downward, then horizontally inward and then downwardly to form respective extended end tip surfaces;

respective screws inserted through said first and second side channels and angled upwardly and threaded into said end tip surfaces to thereby attach said bottom cover to said upper housing; and a driver assembly comprising an LED driver for supplying power to said one or more LEDs mounted in an internal cavity defined by said bottom cover and upper housing, the driver assembly being spring biased upwardly such that a surface of the driver assembly is forced against a surface of the upper housing to facilitate heat transfer between the driver assembly and the upper housing.

2. The lighting platform of claim 1 wherein respective gaps are provided between the ends of the vertical sides of the bottom cover and the lower corners of the outer sides of the upper housing to provide first lens attachment mechanism.

3. The lighting platform of claim 2 wherein a second lens attachment mechanism is provided on an outer generally horizontal surface of the bottom cover.

4. The lighting platform of claim 1 wherein a top portion of the upper housing defines first and second sidewardly facing channels for receiving a slip fitter component.

5. The lighting platform of claim 1 further comprising a second bottom cover and a cover splice component configured to attach together the respective first and second bottom covers.

6. The lighting platform of claim 1 wherein the end tip surfaces are shaped and dimensioned so as to detect misalignment of the respective screws during insertion.

7. The lighting platform of claim 1 wherein said upper housing contains a vertical extrusion fitted between inner vertical edges of said upper housing so as to define a wire way between the vertical extrusion and an inside surface of one of the sides of the upper housing.

8. The lighting platform of claim 7 wherein a cable is connected to the upper housing either directly or through one or more components and to the bottom cover such that the bottom cover is suspendable from the upper housing when the screws attaching the bottom cover to the upper housing are removed.

9. The lighting platform of claim 1 wherein the driver assembly includes a driver bracket attached to a driver component and having respective flanges formed thereon and first and second bolts passing through the respective flanges and through respective springs to attach the driver bracket in position.

10. The lighting platform of claim 1 further comprising a second bottom cover and a plurality of side clips for attaching together said first and second bottom covers.

11. The lighting platform of claim 1 wherein the ends of the vertical portions of the side channels are respectively gapped away from the lower ends of the respective sides of the upper housing.

12. The lighting platform of claim 1 wherein said respective screws are inserted through apertures formed in said first and second side channels.

13. The lighting platform of claim 1 further comprising a circuit board attached to a bottom surface of said bottom cover.

14. The lighting platform of claim 1 wherein the respective end tip surfaces are angled slightly outwardly.

* * * * *